United States Patent
Huang et al.

(10) Patent No.: US 10,777,823 B2
(45) Date of Patent: Sep. 15, 2020

(54) IONIC LIQUID AS PROMOTOR TO ENHANCE THE PERFORMANCE OF OXYGEN REDUCTION CATALYST FOR FUEL CELL APPLICATION

(71) Applicants: Toyota Motor Engineering & Manufacturing North America, Inc., Erlanger, KY (US); The University of Notre Dame, Notre Dame, IN (US); Toyota Jidosha Kabushiki Kaisha, Aichi-ken (JP)

(72) Inventors: Kan Huang, Farmington Hills, MI (US); Oscar Morales Collazo, Notre Dame, IN (US); Joan Brennecke, Notre Dame, IN (US); Hongfei Jia, Ann Arbor, MI (US); Hisao Kato, Nagoya (JP)

(73) Assignees: TOYOTA JIDOSHA KABUSHIKI KAISHA, Toyota-Shi, Aichi-Ken (JP); TOYOTA MOTOR ENGINEERING & MANUFACTURING NORTH AMERICA, INC., Plano, TX (US); THE UNIVERSITY OF NOTRE DAME, Notre Dame, IN (US)

( * ) Notice: Subject to any disclaimer, the term of this patent is extended or adjusted under 35 U.S.C. 154(b) by 80 days.

(21) Appl. No.: 15/477,967

(22) Filed: Apr. 3, 2017

(65) Prior Publication Data
US 2018/0287165 A1     Oct. 4, 2018

(51) Int. Cl.
*H01M 4/86*     (2006.01)
*H01M 4/92*     (2006.01)

(52) U.S. Cl.
CPC ............. *H01M 4/926* (2013.01); *H01M 4/86* (2013.01); *H01M 4/92* (2013.01); *H01M 4/8663* (2013.01); *Y02T 90/32* (2013.01)

(58) Field of Classification Search
CPC ............. H01M 4/8663; H01M 4/926; H01M 2004/8689; H01M 2008/1095; H01M 2250/20; H01M 4/86; H01M 4/92; Y02T 90/32
See application file for complete search history.

(56) References Cited

U.S. PATENT DOCUMENTS

| | | | | |
|---|---|---|---|---|
| 5,872,602 A | * | 2/1999 | Johnson | .................... H04N 5/14 348/620 |
| 2011/0177428 A1 | * | 7/2011 | Dai | ........................ H01B 1/122 429/498 |
| 2011/0189589 A1 | * | 8/2011 | Erlebacher | ............... B01J 21/02 429/523 |
| 2014/0113218 A1 | * | 4/2014 | Erlebacher | ............... B01J 23/89 429/524 |

OTHER PUBLICATIONS

Structural analysis of BETI using ChemBioDraw Ultra. (Year: 2018).*
Structural analysis of NfO (C4F9SO3) using ChemBioDraw Ultra. (Year: 2018).*
"Bis(trifluoromethane)sulfonimide 15220." H2NC6H4CO2C2H5. Drugs, n.d. Web. Feb. 25, 2019. <https://www.sigmaaldrich.com/catalog/product/sial/15220?lang=en®ion=US>. (Year: 2019).*
"Nonafluorobutane-1-sulfonic Acid 562629." H2NC6H4CO2C2H5. Drugs, n.d. Web. Feb. 25, 2019. <https://www.sigmaaldrich.com/catalog/product/aldrich/562629?lang=en®ion=US>. (Year: 2019).*
M. Haibara et al. Electrochimica Acta 132 (2014) 208-213 (Year: 2014).*
Zhang et al. ACS Cat, 2015, 2296. (Year: 2015).*
Snyder, J. et al., "Oxygen Reduction Reaction Performance of [MTBD][beti]-Encapsulated Nanoporous NiPt Alloy Nanoparticles," Adv. Func. Mater., 23, pp. 5494-5501 (2013).
Chen, B. et al., "Improving the Conductivity of Sulfonated Polyimides as Proton Exchange Membranes by Doping of a Protic Ionic Liquid", Polymers, 6, pp. 2720-2736 (2014).
Zhang, G. et al., "Boosting Performance of Low Temperature Fuel Cell Catalysts by Subtle Ionic Liquid Modification," ACS Appl. Mater. Interfaces, 7, pp. 3562-3570 (2015).
Snyder, J. et al., "Oxygen reduction in nanoporous metal-ionic liquid composite electrocatalysts," Nature Materials, vol. 9, pp. 904-907, Nov. 2010.

* cited by examiner

*Primary Examiner* — Alexander Usyatinsky
(74) *Attorney, Agent, or Firm* — Christopher G. Darrow; Darrow Mustafa PC

(57) ABSTRACT

A secondary ionomer that enhances activity and stability of a cathode catalyst in a polymer electrolyte membrane fuel cell includes the ionic liquid, 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]). When contacting the catalyst, [MTBD][$C_4F_9SO_3$] enhances catalyst activity and stability more effectively than previously known ionomers, likely by preventing oxide formation and water adsorption at the catalyst surface. The disclosed secondary ionomer is thus most effective when completely coating the catalyst.

16 Claims, 18 Drawing Sheets

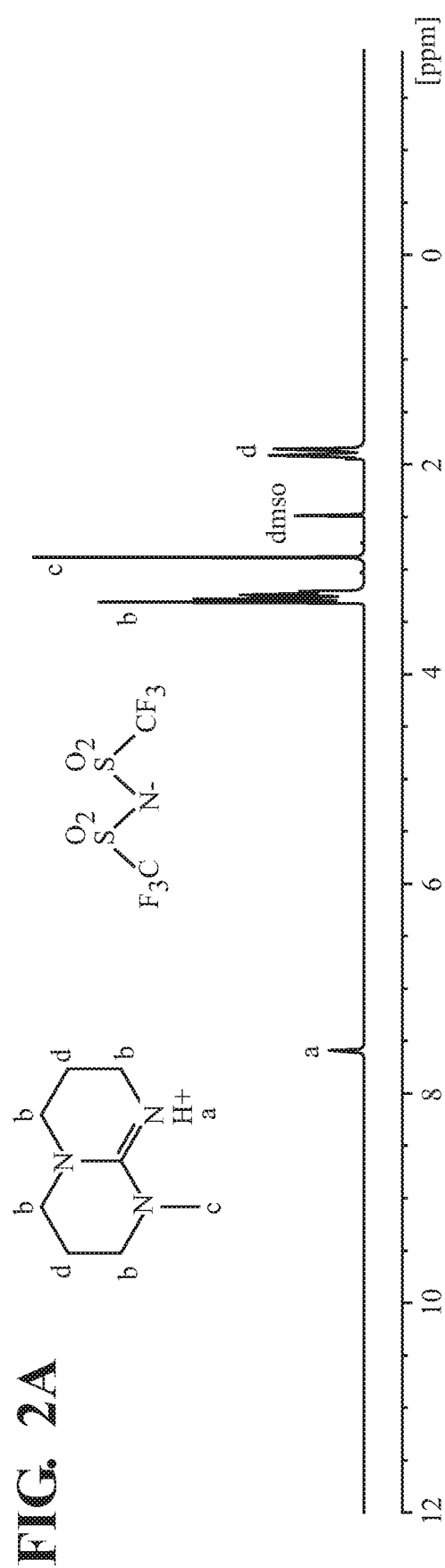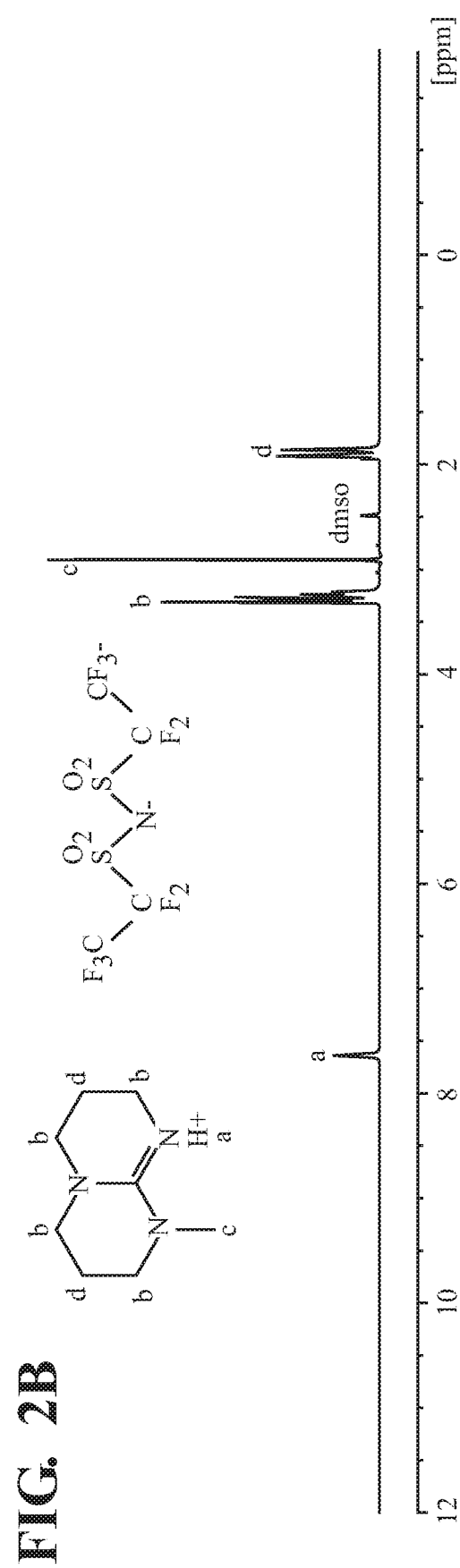
FIG. 2A
FIG. 2B

US 10,777,823 B2

IONIC LIQUID AS PROMOTOR TO ENHANCE THE PERFORMANCE OF OXYGEN REDUCTION CATALYST FOR FUEL CELL APPLICATION

TECHNICAL FIELD

The present disclosure generally relates to fuel cells and, more particularly, to secondary ionomers for polymer electrolyte membrane fuel cells.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Fuel cell vehicles represent a promising option for future mobility because they afford high energy efficiency and include a zero emission powertrain platform. All current fuel cell vehicles on market use polymer electrolyte membrane fuel cells (PEMFCs). While the PEMFC technology has been commercialized for decades, it still faces major challenges of high material cost and substantial performance gap.

The oxygen reduction reaction (ORR) that occurs at the cathode of PEMFCs has relatively slow chemical kinetics, thus posing an obstacle to cell performance. Even with a platinum catalyst, such cells typically suffer from significant overpotential loss and poor durability. Large amounts of catalyst are often used in order to overcome performance issues, however, this substantially increases cost.

So-called secondary ionomers, ionomeric compositions in direct contact with the catalyst, have been proposed to improve catalyst function and/or durability with lower cost. Improved secondary ionomers would be desirable in order to achieve these goals.

SUMMARY

This section provides a general summary of the disclosure, and is not a comprehensive disclosure of its full scope or all of its features.

In various aspects, the present teachings provide an oxygen reduction reaction (ORR) catalyst. The ORR catalyst includes a solid catalyst, and a secondary ionomer contacting the solid catalyst The secondary ionomer includes 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]).

In other aspects, the present teachings provide a polymer electrolyte membrane fuel cell (PEMFC) comprising a cathode for oxygen reduction. The cathode includes a solid catalyst, and a secondary ionomer contacting the solid catalyst The secondary ionomer includes 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]).

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 2A is an NMR spectrum of [MTBD][TFSI];

FIG. 2B is an NMR spectrum of [MTBD][Beti];

Figure 1:
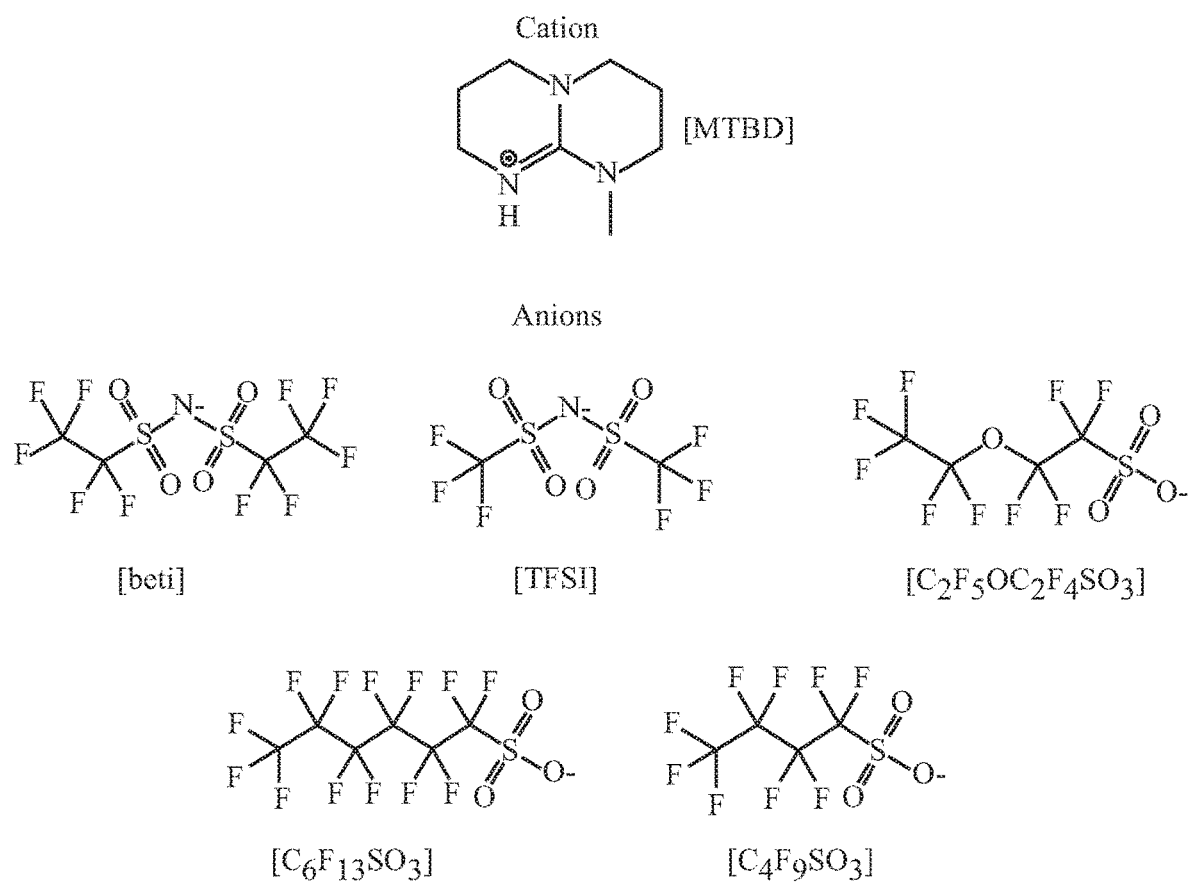
FIG. 1 shows chemical line drawings of various ions referenced herein.
Figure 2C:
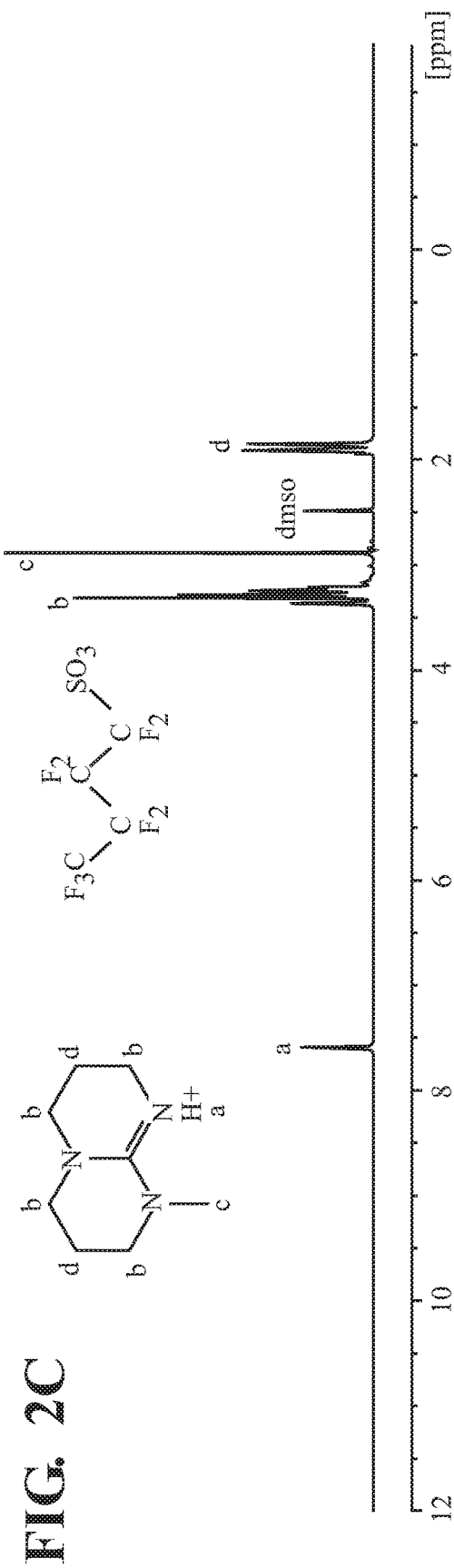
FIG. 2C is an NMR spectrum of [MTBD][$C_4F_9SO_3$]
Figure 2D:
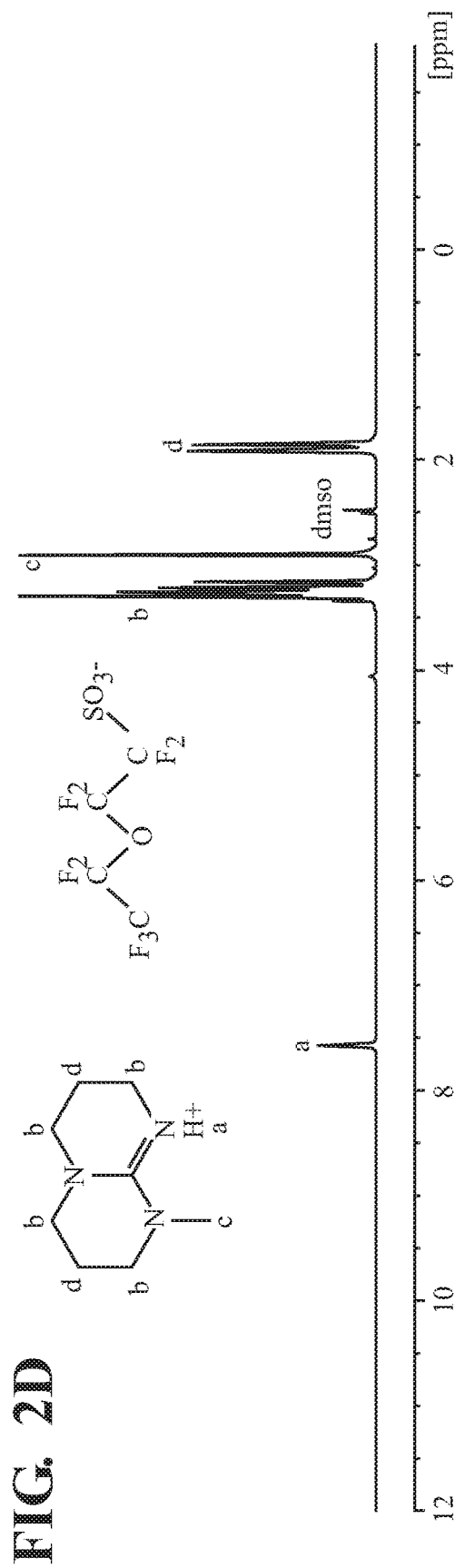
FIG. 2D is an NMR spectrum of [MTBD] [$C_2F_5OC_2F_4SO_3$]
Figure 2E:
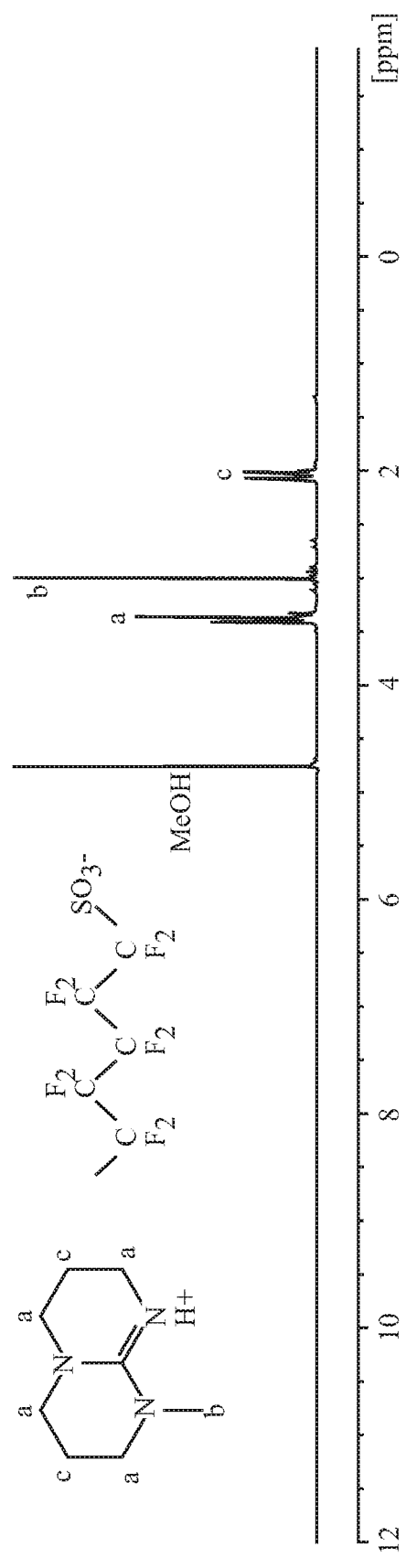
FIG. 2E is an NMR spectrum of [MTBD][$C_6F_{13}SO_3$]

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings describe a new ionic liquid useful as a secondary ionomer in a polymer electrolyte membrane fuel cell (PEMFC). The results described hereinafter show that an oxygen reduction reaction (ORR) catalyst contacted by the ionic liquid and incorporated at the cathode of a PEMFC has superior activity and stability compared to a catalyst having no secondary ionomer or an alternative secondary ionomer.

ORR catalysts of the present teachings may include particles having a catalytic metal, such as platinum. The particles are contacted by the aforementioned secondary ionomer including a novel ionic liquid, resulting in superior activity and stability.

Thus a catalyst composition for catalyzing ORR (referred to alternatively as an ORR catalyst) in a PEMFC is disclosed. The catalyst composition includes a solid catalyst that will typically include particles or another high-surface-area form of a catalytic metal. In some implementations, the catalytic metal will be particles of platinum, or a platinum-containing alloy. In some implementations, the solid catalyst will include particles of a catalytic metal in admixture with particles of another material, such as carbon.

In some implementations, the particles of a catalytic metal will have a specific surface area of at least 10 m$^2$/g, or 20 m$^2$/g, or 30 m$^2$/g, or 40 m$^2$/g, or 50 m$^2$/g, or 60 m$^2$/g, or 70 m$^2$/g, or 80 m$^2$/g, or 90 m$^2$/g, or 100 m$^2$/g. In some implementations, the particles of a catalytic metal will be nanoparticles having an average maximum dimension of less than 100 nm, or less than 90 nm, or less than 80 nm, or less than 70 nm, or less than 60 nm, or less than 50 nm, or less than 40 nm, or less than 30 nm, or less than 20 nm, or less than 10 nm. In some specific implementations, the catalyst composition will include platinum nanoparticles having an average maximum dimension of 2-5 nm. In some implementations, the particles of a catalytic metal will include porous particles.

Catalyst compositions of the present disclosure include a secondary ionomer contacting the particles of a catalytic metal. The secondary ionomer includes the ionic liquid, 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][C$_4$F$_9$SO$_3$]). [MTBD][C$_4$F$_9$SO$_3$], when contacting particles of a catalytic metal, improves ORR efficiency and catalyst stability, as discussed further below. A catalyst that includes particles of a catalytic metal in contact with an ionic liquid will be referred to henceforth as a secondary ionomer catalyst. In certain exemplary embodiments discussed herein, the solid catalyst will include a mixture of platinum and carbon particles. Such an exemplary catalyst, when contacted by [MTBD][C$_4$F$_9$SO$_3$], will be alternatively referred to as Pt/C-[MTBD][C$_4$F$_9$SO$_3$]. In some implementations, the catalyst composition may also include a polymeric ionomer, such as Nafion™, contacting the solid catalyst.

In some implementations, catalyst compositions of the present disclosure will have [MTBD][C$_4$F$_9$SO$_3$] present at a weight ratio relative to the solid catalyst within a range of 1.25:1 to 3.85:1. In some implementations, catalyst compositions of the present disclosure will have [MTBD][C$_4$F$_9$SO$_3$] present at a weight ratio relative to the solid catalyst within a range of 2:1 to 3:1. In some implementations, catalyst compositions of the present disclosure will have [MTBD][C$_4$F$_9$SO$_3$] present at a weight ratio relative to the solid catalyst within a range of 2.5:1 to 2.6:1. In some implementations, particles of catalytic metal will be fully coated by the [MTBD][C$_4$F$_9$SO$_3$], and in other implementations, particles of catalytic metal will be partially coated by the [MTBD][C$_4$F$_9$SO$_3$]. In some implementations, particles of catalytic metal will be porous and will be impregnated with the [MTBD][C$_4$F$_9$SO$_3$].

The [MTBD] cation and the [C$_4$F$_9$SO$_3$] anion that make up the disclosed ionic liquid are shown in FIG. 1, along with several comparison anions. FIGS. 2A-2E show NMR spectra of ionic liquids composed of [MTBD] and each of the five anions shown in FIG. 1, confirming their synthesis and purity.

Figure 3A:
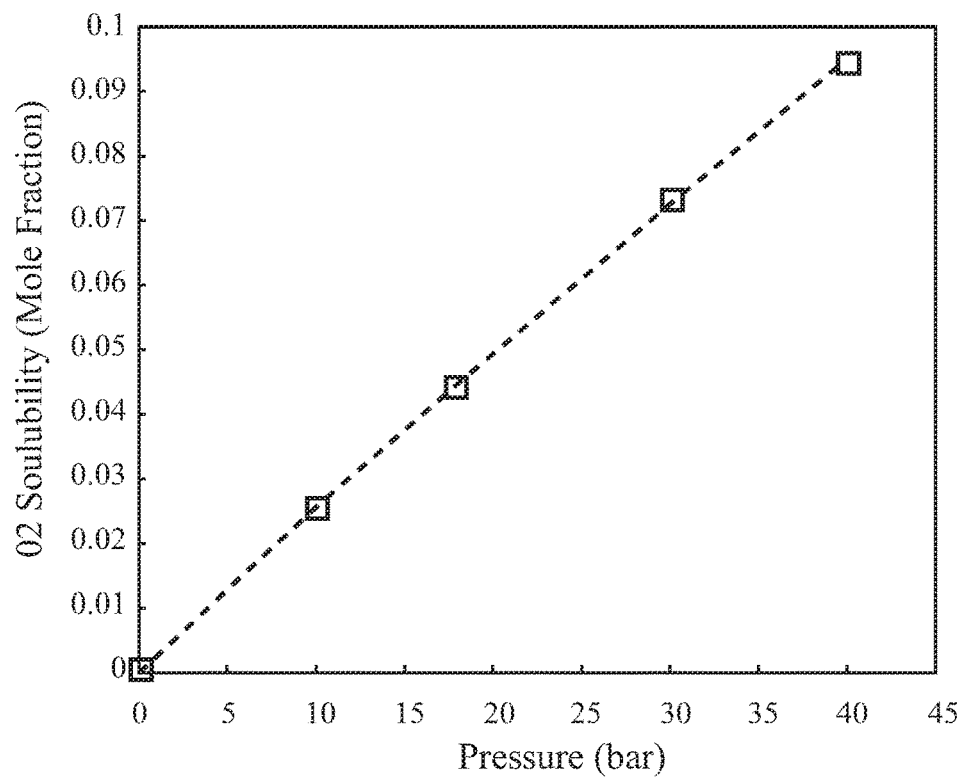
FIG. 3A is a plot of $O_2$ molar fraction as a function of pressure at room temperature for [MTBD][TFSI]
Figure 3B:
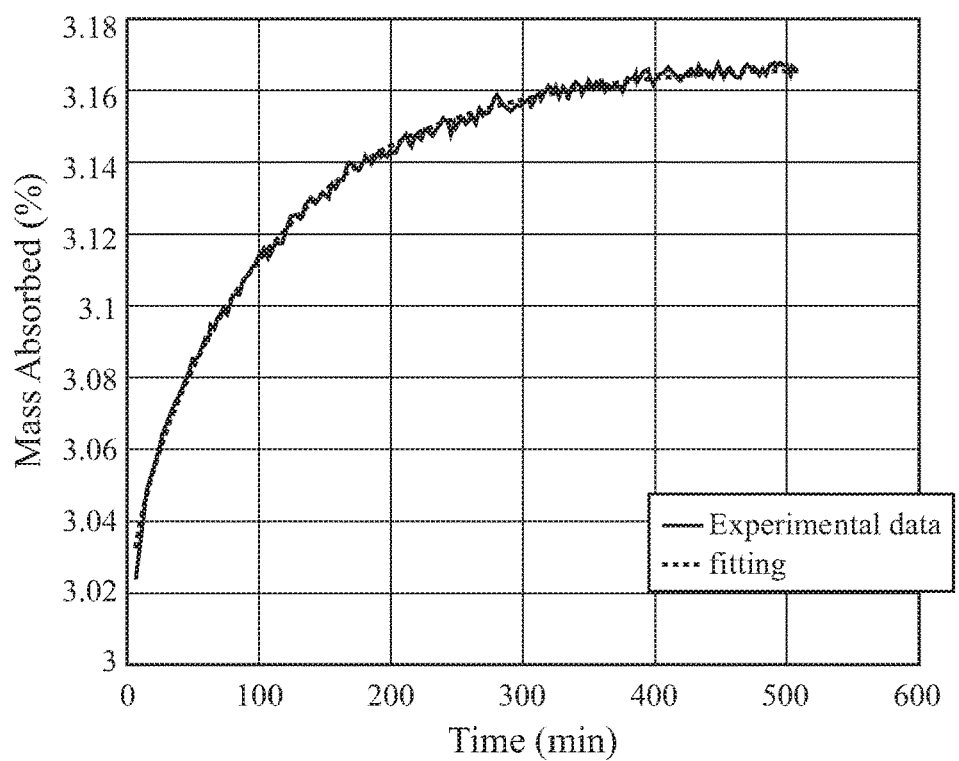
FIG. 3B is a plot of time-dependent absorption of $O_2$ in [MTBD][TFSI]

FIG. 3A shows O$_2$ solubility measured at room temperature at pressure up to 45 bar for [MTBD][TFSI], with FIG. 3B showing an exemplary O$_2$ absorption kinetic trace. A good linearization is found between pressure and mole fraction, and O$_2$ mole fraction ([O$_2$]) at 1 bar is extrapolated from the plot. One-dimensional mass diffusion is employed to calculate the diffusion coefficient (D) according to Equation 1.

$$\frac{\partial C}{\partial t} = D \frac{\partial^2 C}{\partial z^2} \qquad \text{Eq. 1}$$

with an initial condition: $C=C_0$, when $t=0$, and $0<z<L$; and a boundary condition: $C=C_s$, when $t>0$, and $z=0$, and $$\frac{\partial C}{\partial z} = o;$$

where C is the concentration of O$_2$ in IL; $C_0$ is the initial homogeneous concentration of O$_2$ in IL, and its initial value is zero; $C_s$ is the saturation concentration; L is the depth of the ionic liquid in the sample container; D is the diffusion coefficient that is assumed to be a constant. The analytical solution of space average O$_2$ concentration (<C>) is determined according to Equation 2, and the fitting results, showing time-dependent absorption of O$_2$ in [MTBD][TFSI], are shown in FIG. 3A.

$$<C> = C_s \left[ 1 - 2\left(1 - \frac{C_o}{C_s}\right) \sum_{n=0}^{\infty} \frac{\exp(-\lambda_n^2 Dt)}{L^2 \lambda_n^2} \right] \qquad \text{Eq. 2}$$

where $\lambda_n = \dfrac{\left(n + \frac{1}{2}\right)\pi}{L}$.

The $O_2$ diffusion properties in the various test ionic liquids are summarized in Table 1. It should be noted that [MTBD][$C_2F_5OC_2F_4SO_3$], [MTBD][$C_6F_{13}SO_3$], and [MTBD][$C_4F_9SO_3$] are solid at room temperature, making the direct measurement of $O_2$ diffusion at room temperature impossible. But because [MTBD][$C_2F_5OC_2F_4SO_3$], [MTBD][$C_6F_{13}SO_3$], and [MTBD][$C_4F_9SO_3$] are soluble in [MTBD][TFSI], the $O_2$ solubility and diffusion in mixed ionic liquids is measurable. The individual $O_2$ solubility is calculated according to the Lever Rule, as indicated by Equation 3:

$$X_{O2} = X1 * X_{O2,1} + X2 * X_{O2,2} \qquad \text{Eq. 3}$$

where $X_{O2}$ is [$O_2$] in the ionic liquid mixture, X1 and X2 are mole fraction of individual ILs in the gas-free mixture, and $X_{O2,1}$ and $X_{O2,2}$ are [$O_2$] in pure individual ILs. Regarding the diffusion coefficient of those solid ILs, elevated temperature was required to reach a liquid phase and diffusion coefficients are thus reported at 60° C.

Figure 4A:
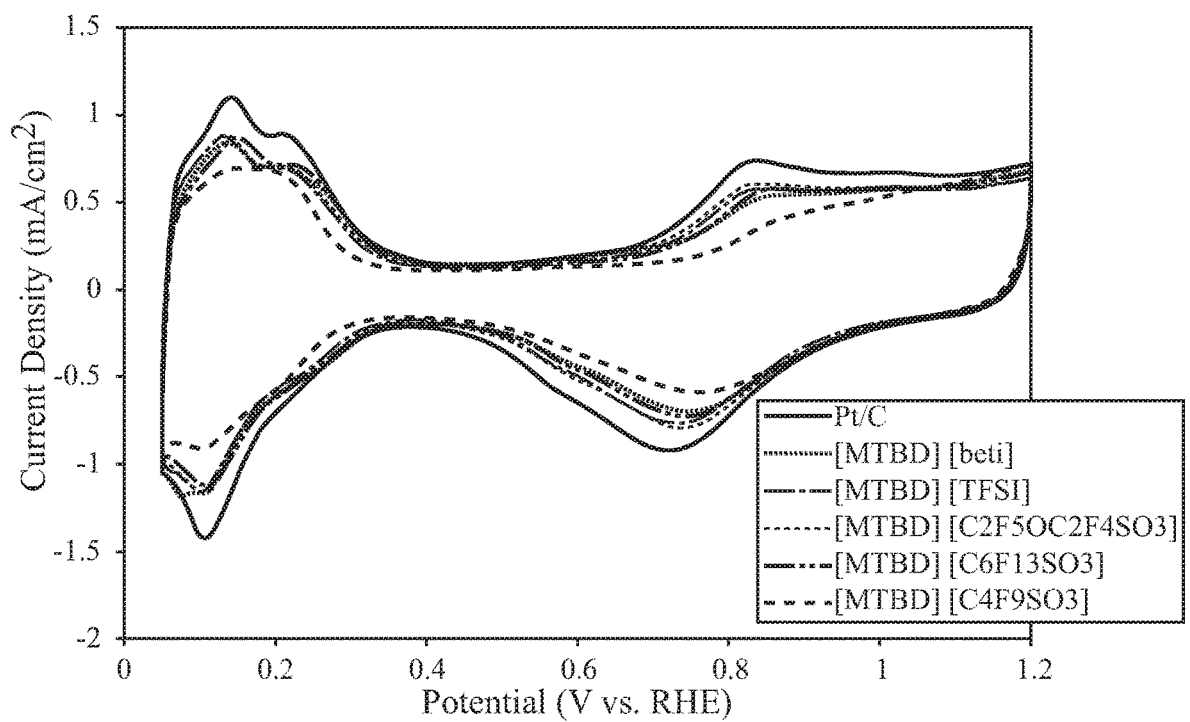
FIG. 4A is a series of cyclic voltammetry curves of PEMFCs having various secondary ionomers in $N_2$-saturated 0.1 M $HClO_4$.
Figure 4B:
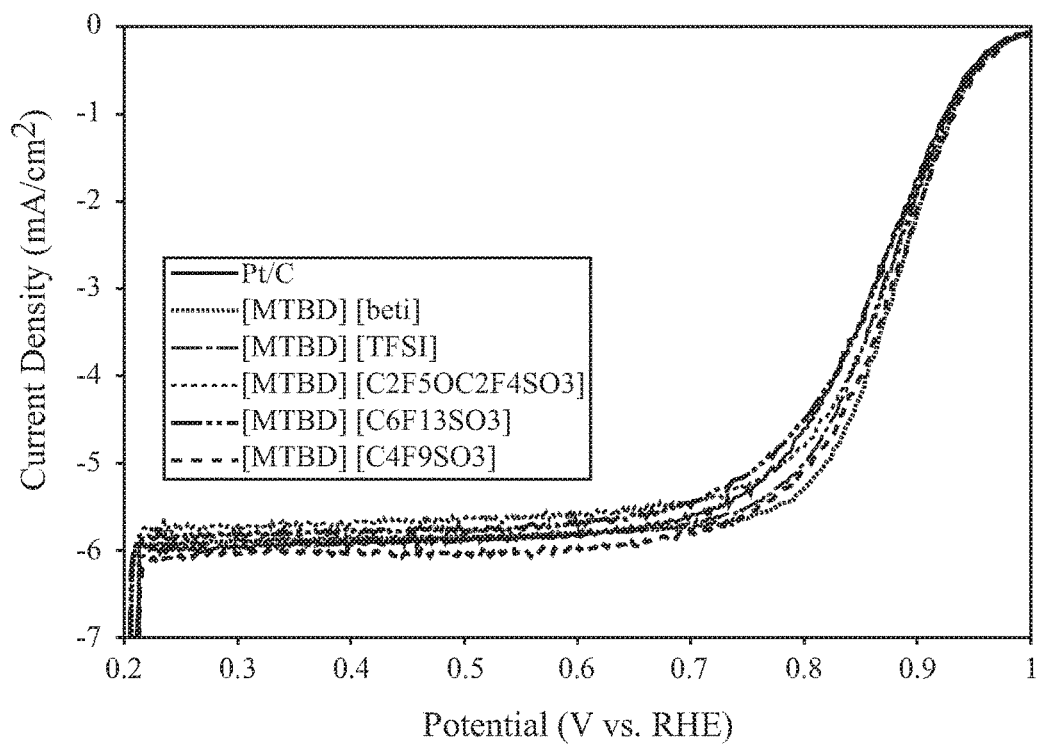
FIG. 4B is a series of polarization curves in $O_2$-saturated 0.1 M $HClO_4$ at rotation rate of 1600 rpm.
Figure 4C:
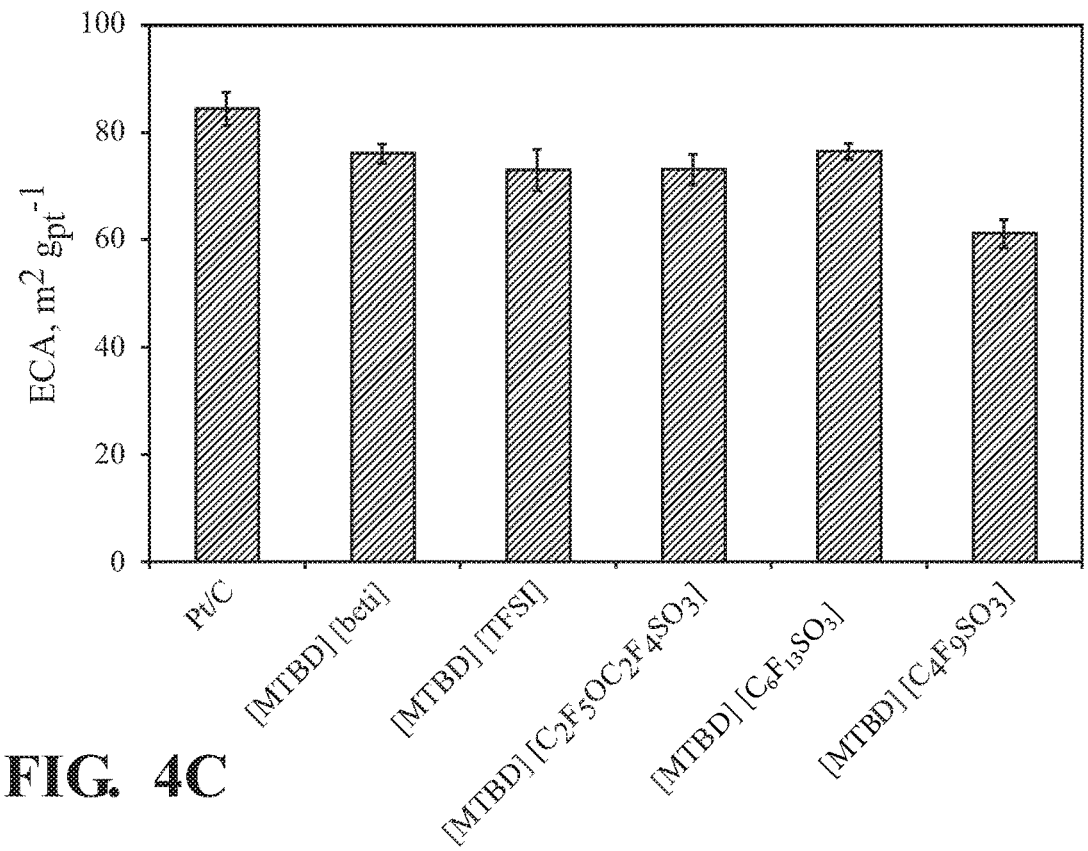
FIG. 4C plots electrochemical active surface area (ECA) of oxygen reduction reaction catalysts having various secondary ionomers.
Figure 4D:
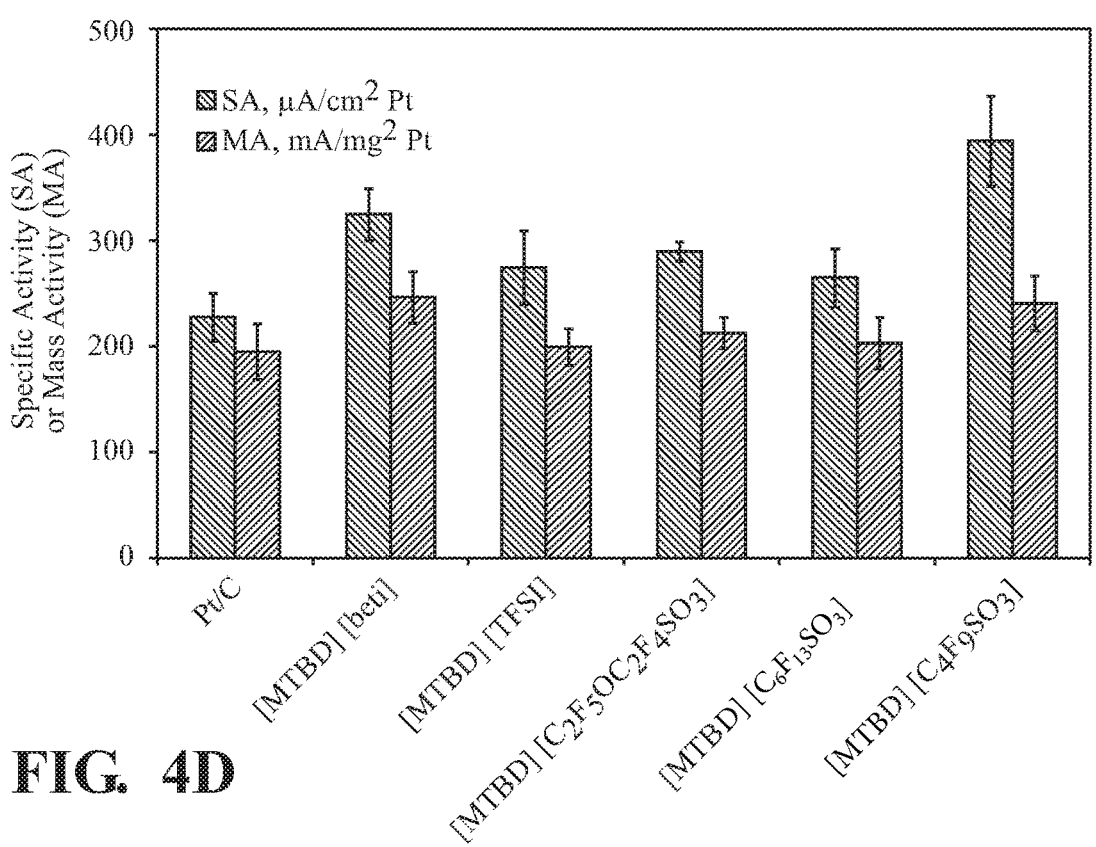
FIG. 4D plots specific activity (SA) and mass activity (MA) of the oxygen reduction reaction catalysts of FIG. 4C.

FIGS. 4A and 4B show cyclic voltammetry and polarization curves, respectively, of PEMFCs having an exemplary catalyst of the present disclosure. The various catalysts discussed herein include an admixture of platinum and carbon particles (Pt/C) contacted by the disclosed ionic liquid [MTBD][$C_4F_9SO_3$], or contacted by a comparative ionic liquid, or contacted by no ionic liquid. As shown in FIG. 4C, the ORR catalysts contacted by an ionic liquid has lower electrochemical active surface area (ECA) than does the ORR catalyst lacking a secondary ionomer. However, as shown in FIG. 4D, the secondary ionomer catalysts have superior specific activity than does the catalyst without a secondary ionomer; in particular the secondary ionomer catalyst of the present disclosure has the highest specific activity. The ECA loss shown in FIG. 4C is moderate (10-13%), however a loss of 28% is experienced with the secondary ionomer catalyst of the present disclosure (the catalyst contacted by [MTBD][$C_4F_9SO_3$]). The variations in ECA might be due to variations in the adsorption of ionic liquids on the Pt. It is also worth noting that the potential onset of platinum oxidation is positively shifted in catalysts that are contacted with ionic liquids, [MTBD][$C_4F_9SO_3$] showing the largest shift.

It will be understood that Equation 4 generally describes the rate of ORR:

$$i = nFK[O_2](1-\theta)\exp\left(\frac{-\beta FE}{RT}\right)\exp\left(\frac{-\omega\theta}{RT}\right) \qquad \text{Eq. 4}$$

where n is number of electron transferred, F is faraday constant, K is a chemical rate constant, $(1-\theta)$ is the available surface, β is symmetry factor, E is the applied potential, and ω is the energy parameter for the Temkin isotherm. Thus, Equation 4 indicates that current density is proportional to oxygen concentration.

Because the presence of an ionic liquid, secondary ionomer contacting the catalytic metal particles improved oxygen concentration by a factor of ~6, it could be expected that this will yield a proportional increase in current density. However, as shown in FIGS. 4B and 4D, the mass activity (MA) improvement resulting from contact of the catalyst particles by an ionic liquid is limited. For example, the highest mass activity of secondary ionomer catalyst at 0.9 V is ~250 mA/mg Pt; representing an increase of ~27% compared to the catalyst without secondary ionomer. It will be noted that the current density is not only determined by the concentration of reactant (C) near the surface, but also the thickness of diffusion layer (δ) and diffusion coefficient (D). Therefore, the product of C and D can be considered as an important parameter to judge effectiveness of gas diffusion through a solid electrolyte. From Table 1, one can see that due to the much lower diffusion coefficient of oxygen ($D_{O2}$), the final product of C×D didn't show a higher value than in the aqueous electrolyte (0.1 M $HClO_4$ in this work). Thus, one can speculate that the comparable oxygen mole flux might be one of the factors to limit the dramatic boost of ORR activity resulting from the presence of the secondary ionomer.

TABLE 1

The solubility and diffusion coefficient of oxygen in ILs used in this study

| Sample | Form | [$O_2$] at R.T. (mM) | $D_{O2}$ at 30 bar ($10^{-6}$ cm$^2$/s) | [$O_2$] × $D_{O2}$ at R.T. ($10^{-6}$ mol · cm$^{-1}$/s) |
|---|---|---|---|---|
| MTBD[beti] | Liquid | 5.9 | 1.76 @ R.T. | 10.21 |
| MTBD[TFSI] | Liquid | 5.5 | 3.04 @ R.T. | 16.72 |
| [MTBD][$C_2F_5OC_2F_4SO_3$] | Solid | 8.1 | —* | — |
| [MTBD][$C_6F_{13}SO_3$] | Solid | 10.9 | 22 @ 60° C. | — |
| [MTBD][$C_4F_9SO_3$] | Solid | 8.4 | 16 @ 60° C. | — |
| 0.1M $HClO_4$ | Liquid | 1.18 | 19 @ R.T. | 22.42 |

Note
*The melting point of [MTBD][$C_2F_5OC_2F_4SO_3$] is ~59° C. Higher temperature than 70° C. is required to completely melt it.

Figure 5:
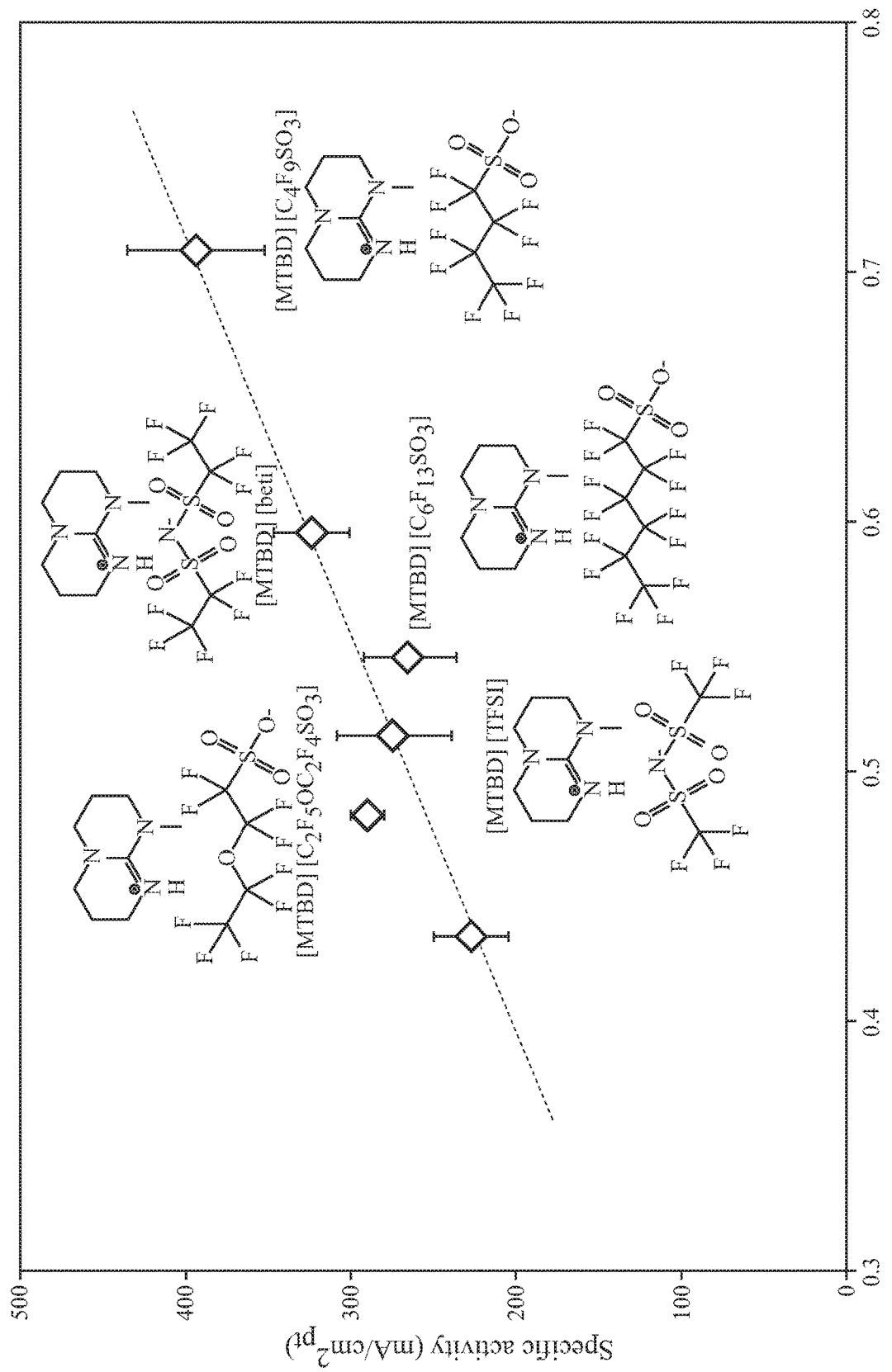
FIG. 5 plots specific activity as a function of oxides free Pt sites on the catalysts of FIGS. 4C and 4D.

Alternatively, various catalysts (e.g. catalytic particles contacting the disclosed ionic liquid, contacting a comparative ionic liquid, or free of any secondary ionomer) can be compared via specific activity (SA, mA $cm_{Pt}^{-2}$), which describes the activity per available (oxide-free) Pt site, as shown in FIG. 4E plotting the specific activity as a function of oxides free Pt sites $(1-\theta_{OH})$. Notably, the secondary ionomer catalysts having comparative ionic liquids has specific oxide coverage $(\theta_{OH})$ in a range of about 0.4~0.5. However, the exemplary catalyst of the present disclosure, having carbon-supported platinum nanoparticles contacted by [MTBD][$C_4F_9SO_3$] exhibits the lowest oxide coverage. This observation, in combination with the results discussed above, suggest that the secondary ionomer catalyst of the present disclosure is based, not on oxygen solubility in the ionic liquid, but on suppression of nonreactive species (e.g. Pt-oxides). The results of the present disclosure suggest that the predominating factor in the superior performance of the disclosed secondary ionomer catalyst can be attributed to the hydrophobic coating that the ionic liquid provides to the catalyst particles. Stated alternatively, the ionic liquid imposes a lateral repulsion of oxygen species and weakens the —OH adsorption, leading to the improved specific activity. Further highlighting this view is an apparent linear relationship between specific activity and available platinum surfaces, as shown in FIG. 5.

Figure 6A:
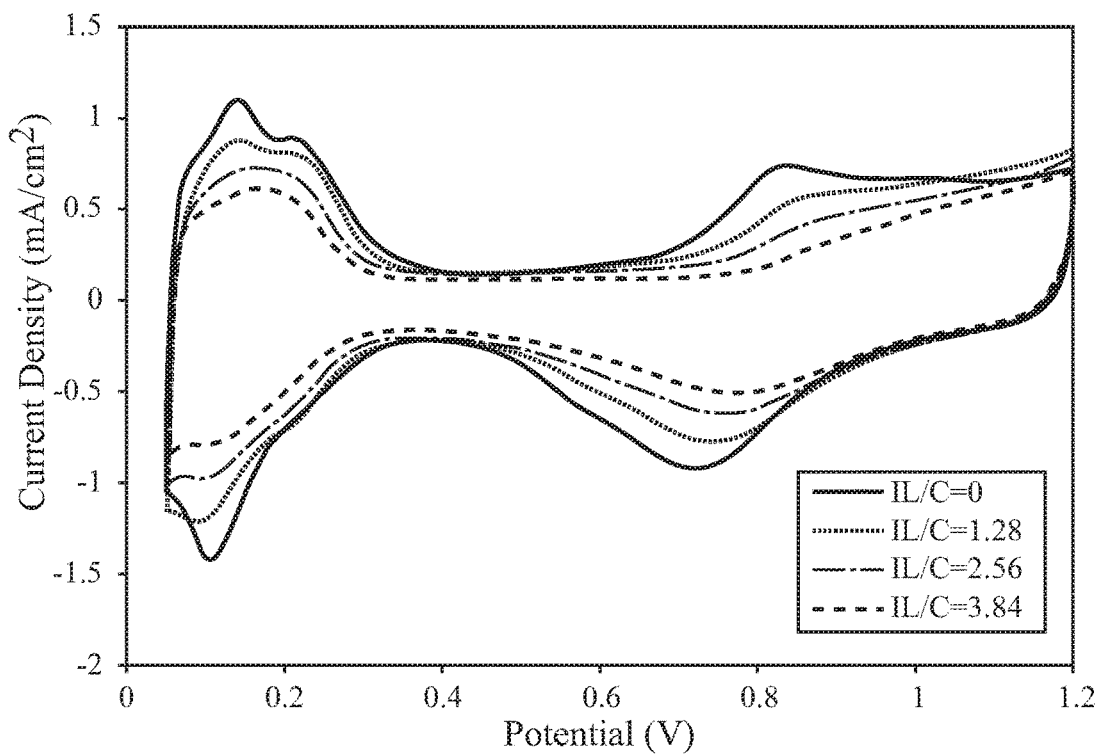
FIG. 6A is a series of cyclic voltammetry curves of Pt/C-[MTBD][$C_4F_9SO_4$] with various IL/C ratio.
Figure 6B:
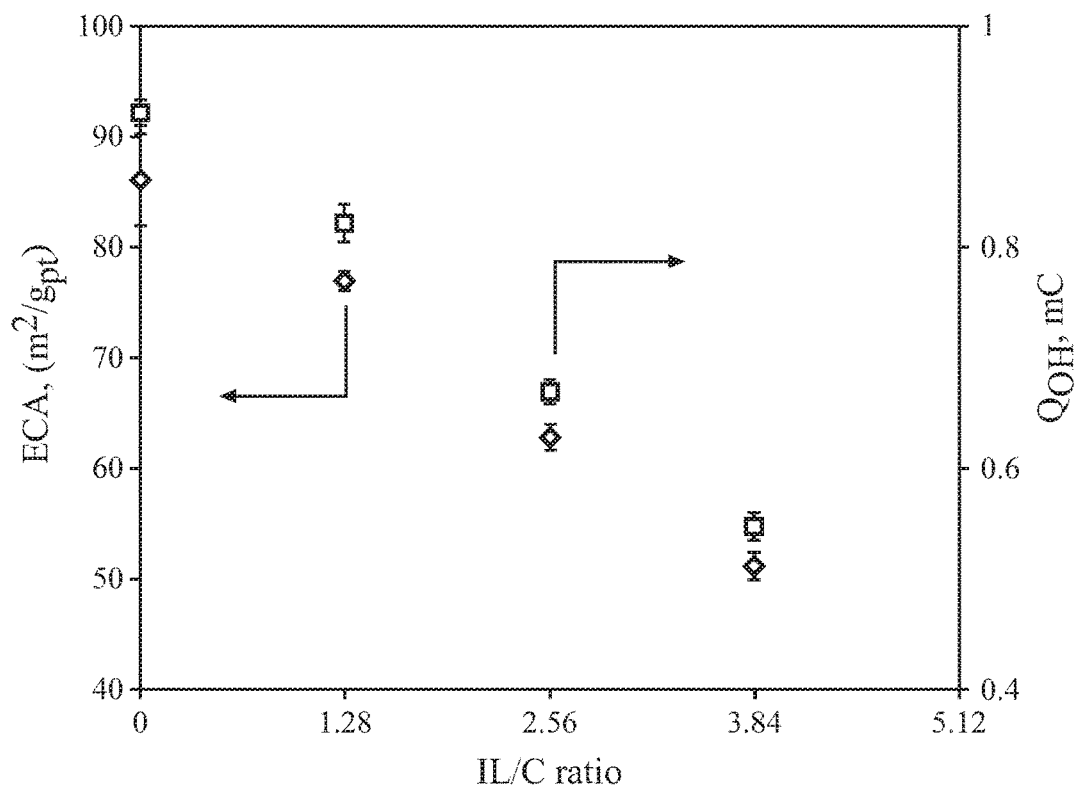
FIG. 6B plots the ECA and charge of Pt-oxides during potential range from 0.6V to 1.2 V.

FIG. 6A shows cyclic voltammetry of various PEMFCs having disclosed secondary ionomer catalysts with various weight ratios of ionic liquid ([MTBD][$C_4F_9SO_3$]) to catalyst particles (referred to alternatively herein as IL/C ratio). It can be readily observed in the hydrogen adsorption/desorption region that the ECA decreased quickly with increasing IL/C ratio and a 40% loss was observed at IL/C=3.84. Meanwhile, FIG. 6B further shows the onset potential of Pt-oxides formation is positively shifted and the resulting oxide formation was correspondingly suppressed. This observation is consistent with the theory that [MTBD][$C_4F_9SO_3$] as a secondary ionomer improves catalyst performance via formation of a hydrophobic layer that suppresses formation of inactive oxides on catalytic metal particle surfaces.

Figure 7A:
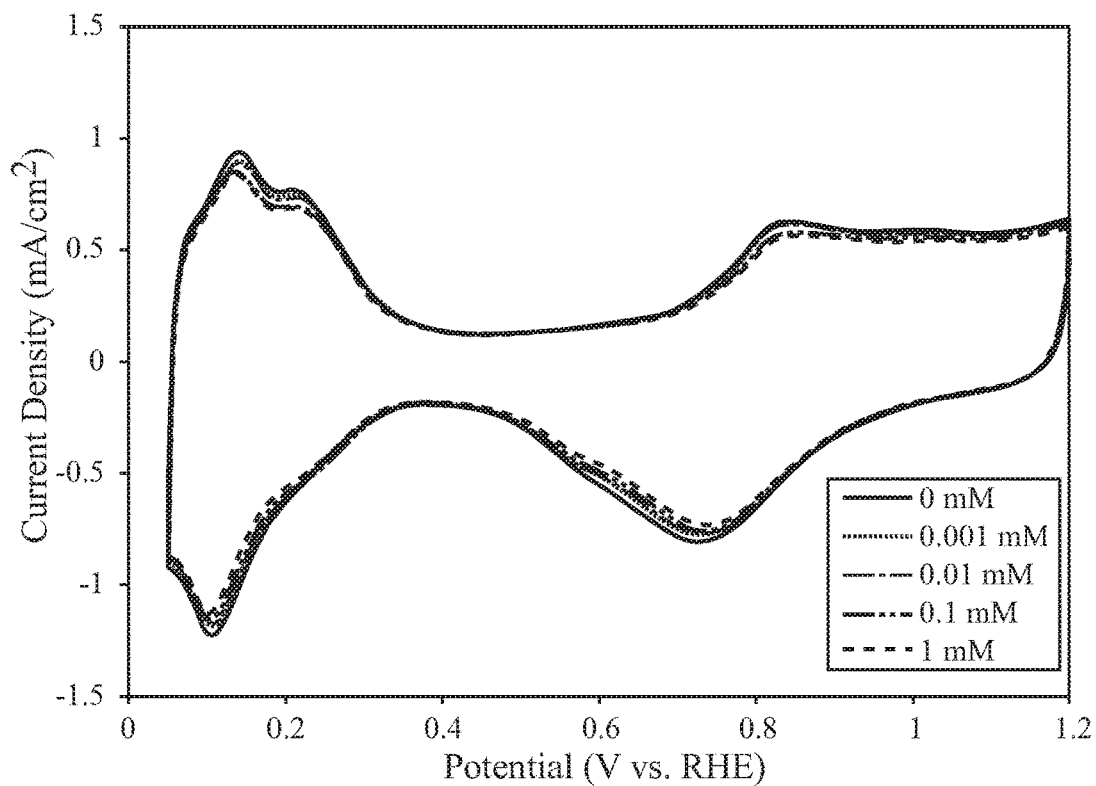
FIG. 7A is a series of cyclic voltammetry curves of Pt/C with various K[$C_4F_9SO_4$] concentration in $N_2$-saturated 0.1 M $HClO_4$.
Figure 7B:
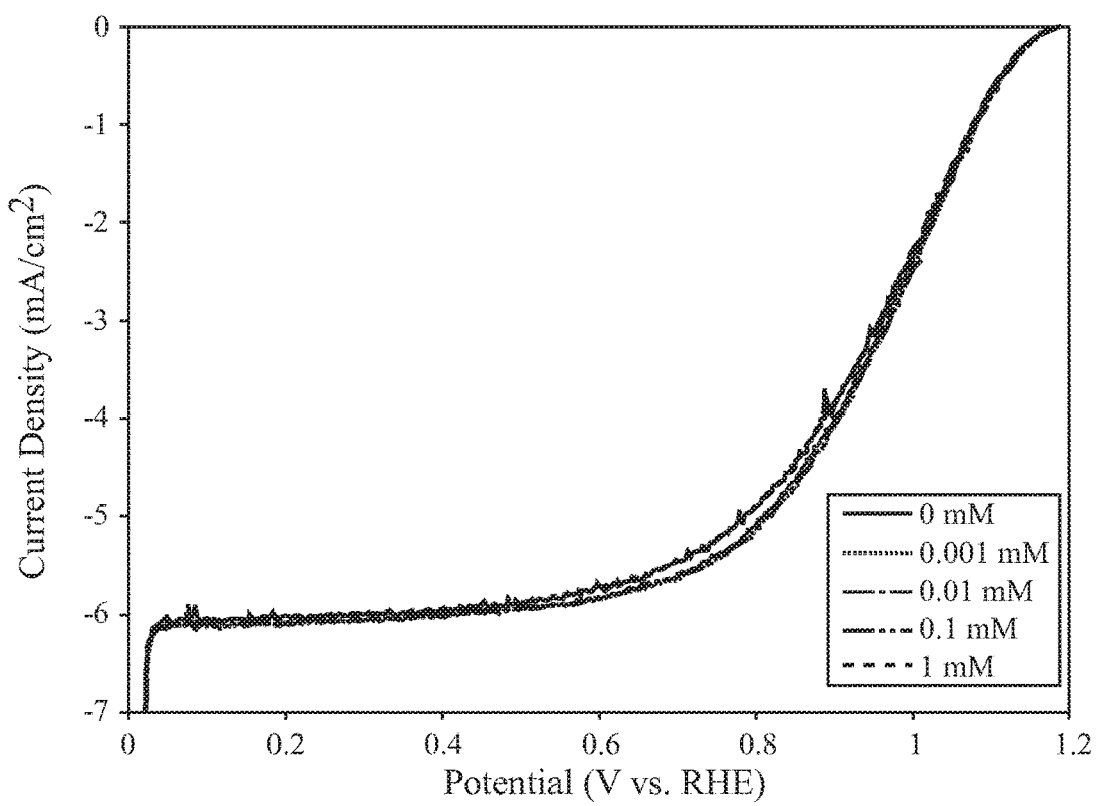
FIG. 7B is a series of polarization curves of Pt/C with increasing K[$C_4F_9SO_4$] concentration from 0 mM to 1 mM in $O_2$-saturated 0.1 M $HClO_4$ at rotation speed of 1600 rpm.

To study the possibility that the nature of the anion is largely responsible for such an effect, the anion precursor, K[$C_4F_9SO_3$] of the disclosed ionic liquid, is considered to simulate the [$C_4F_9SO_3$]$^-$ adsorption on Pt/C. As shown in FIGS. 7A and 7B, [$C_4F_9SO_3$]$^-$ concentrations varied from 0 mM to 1 mM in 0.1 M $HClO_4$. It will be understood that the total mole content of available [$C_4F_9SO_3$]$^-$ in the electrolyte is far higher than that in the catalyst layer, ensuring the adequate anion supply for the adsorption process. It is observed that cyclic voltammetry behavior varies insignificantly between 0 M and 1 mM [$C_4F_9SO_3$]$^-$, especially in the Hupd and Pt redox regions. A small ECA (~8%) drop and a slight negative shift of the linear sweep voltammetry were observed at 1 mM compared to 0 M. The small CV and ORR behavior changes implied that the binding of [$C_4F_9SO_3$]$^-$ on the Pt surface was weak and would not affect the Pt electrochemical behavior very much. The small ECA loss may be due to the foaming occupying on the catalyst layer, and the small decay of ORR performance in the kinetic-diffusion mixed region can be ascribed to the disruption of local gas transport near the rotating disk. In summary, the anion adsorption study shown in FIGS. 7A and 7B suggests that the loss of ECA and decrease of Pt-oxides formation were not due to the anion occupation.

Figure 8A:
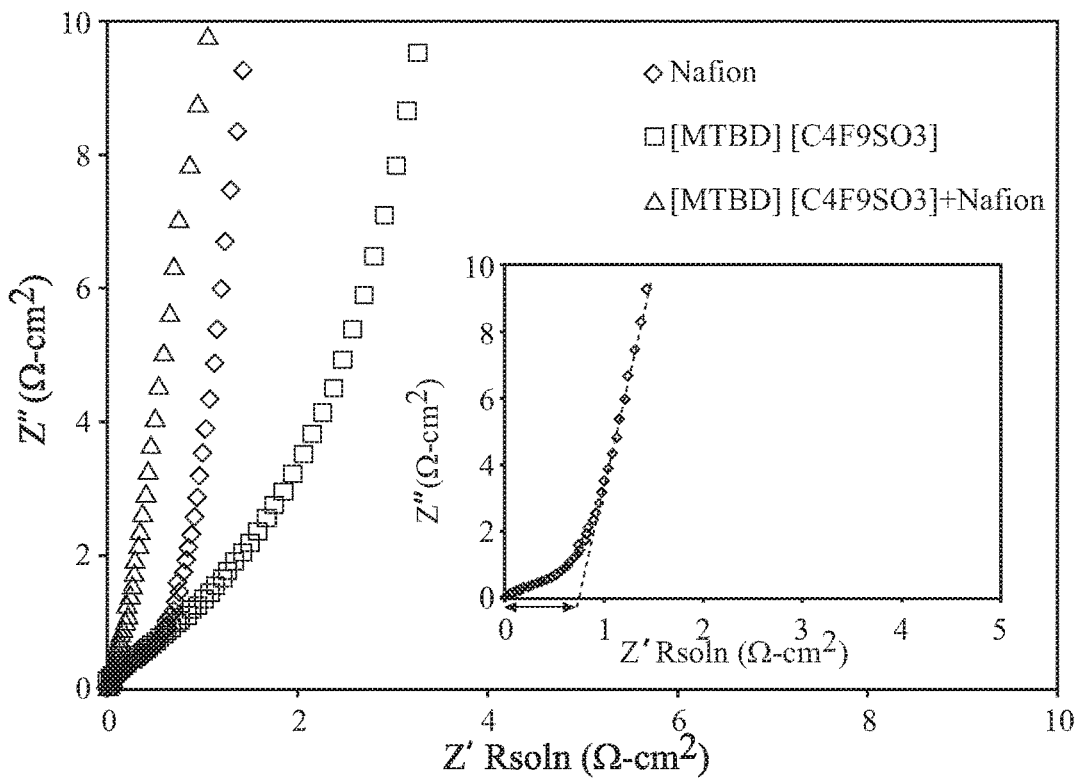
FIG. 8A is a Nyquist plot of impedance spectra measured under $N_2$-saturated 0.1 M $HClO_4$ for catalyst layer blended with Nafion™ only, [MTBD][$C_4F_9SO_3$] only and mixture of Nafion™ and [MTBD][$C_4F_9SO_3$] with IL/C ratio of 2.56.
Figure 8B:
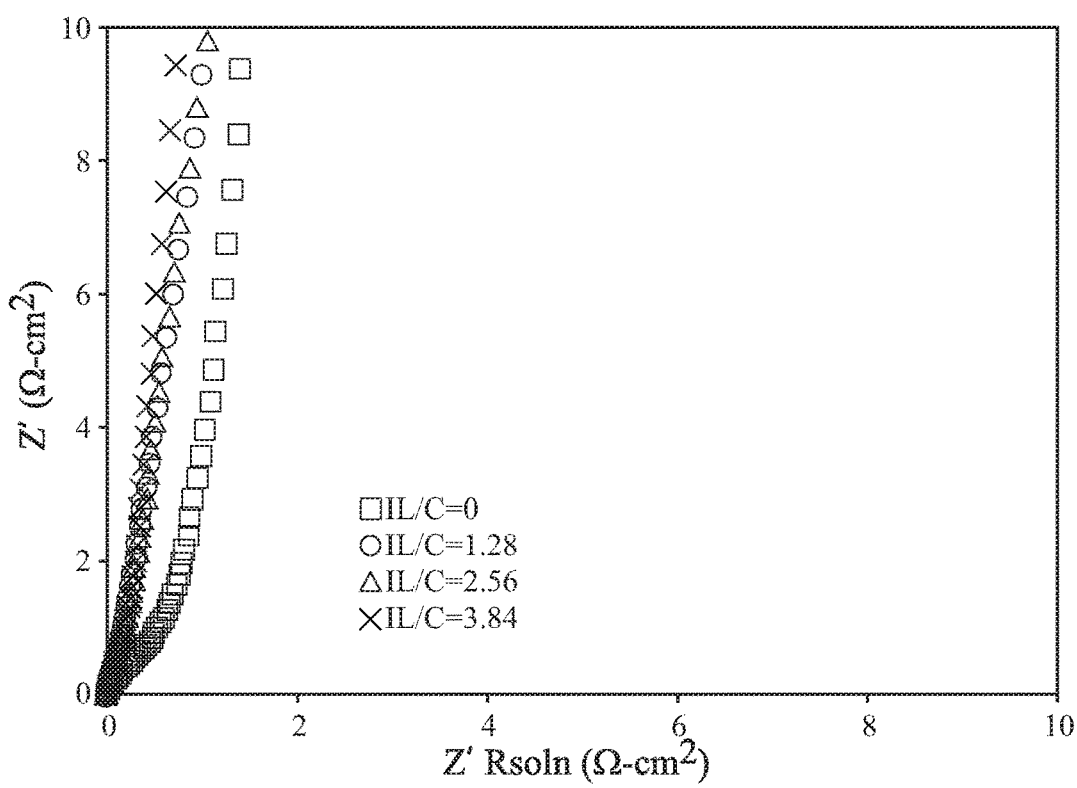
FIG. 8B is series of Nyquist plots of impedance spectra measured under $N_2$-saturated 0.1 M $HClO_4$ for catalyst layer with various ratios of ionic liquid to carbon.

In the experiments described above, the layer of metal catalyst particles on the glassy carbon disk included a mixed film of Nafion™ and ionic liquid, soaked in 0.1 M $HClO_4$. Due to the thinness of the catalyst layer and the abundance of electrolyte, the associated protonic resistance is difficult to study. Referring now to FIGS. 8A and 8B, to reveal the proton diffusion within the catalyst layer, three Pt/C catalyst layers on glassy carbon are fabricated according to the rotating disk electrode preparation described in the Examples: a catalyst layer having Pt/C combined with Nafion™, a catalyst layer having Pt/C combined with [MTBD][$C_4F_9SO_3$], and a catalyst layer having Pt/C combined with Nafion™ and [MTBD][$C_4F_9SO_3$]. The Nyquist plots shown in FIG. 8A include x-axis intercepts showing the effective catalyst layer protonic resistance, RH+. The calculated values are 1.65, 5.14, and 0.17 Ω-cm$^2$, respectively, showing a substantially improved efficiency of proton transport when Nafion™ is combined with [MTBD][$C_4F_9SO_3$] in the secondary ionomer.

This experiment is also performed at different ratios of ionic liquid to catalyst, as shown in FIG. 8B. In the studied IL/C range, the ionic liquid imposes negligible protonic resistance within the catalyst layer. These results also suggest that any loss of non-oxidized surface area on catalyst particles when contacted by ionic liquid is likely not a result of insufficient proton supply to complete hydrogen adsorption process.

Figure 9A:
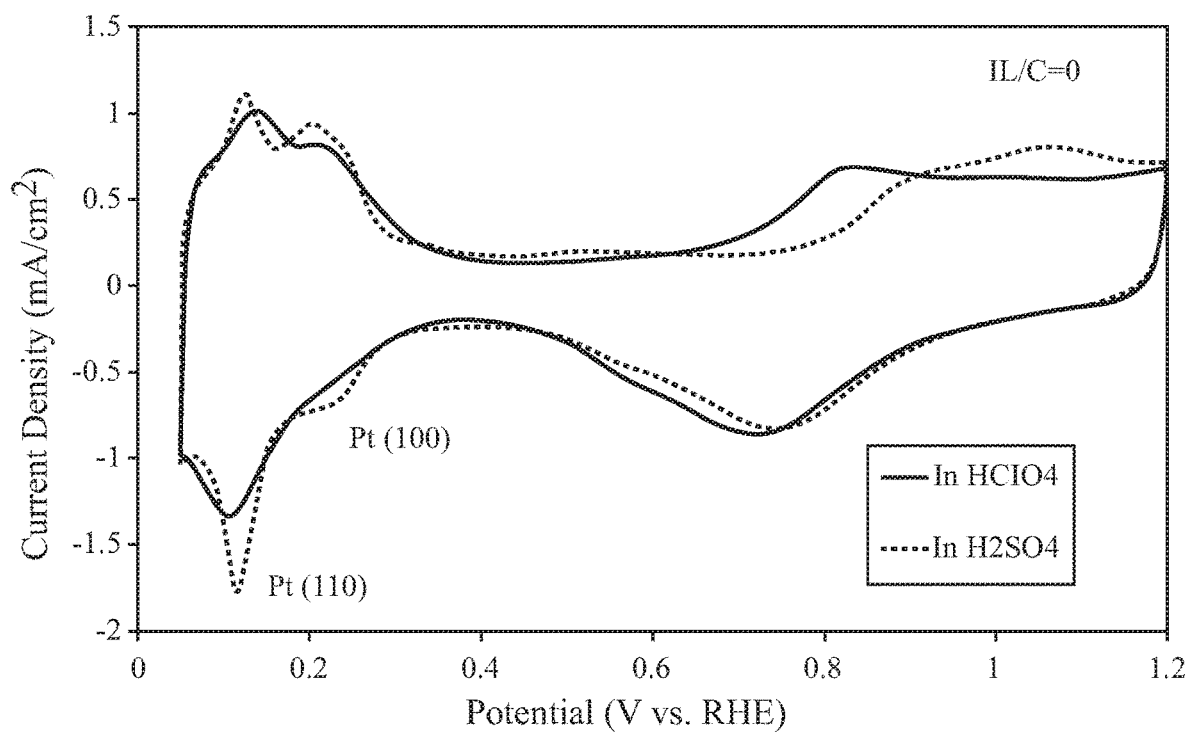
FIG. 9A is a series of cyclic voltammetry curves of Pt/C catalyst in $N_2$-saturated 0.1 M $HClO_4$ and $0.5H_2SO_4$.
Figure 9B:
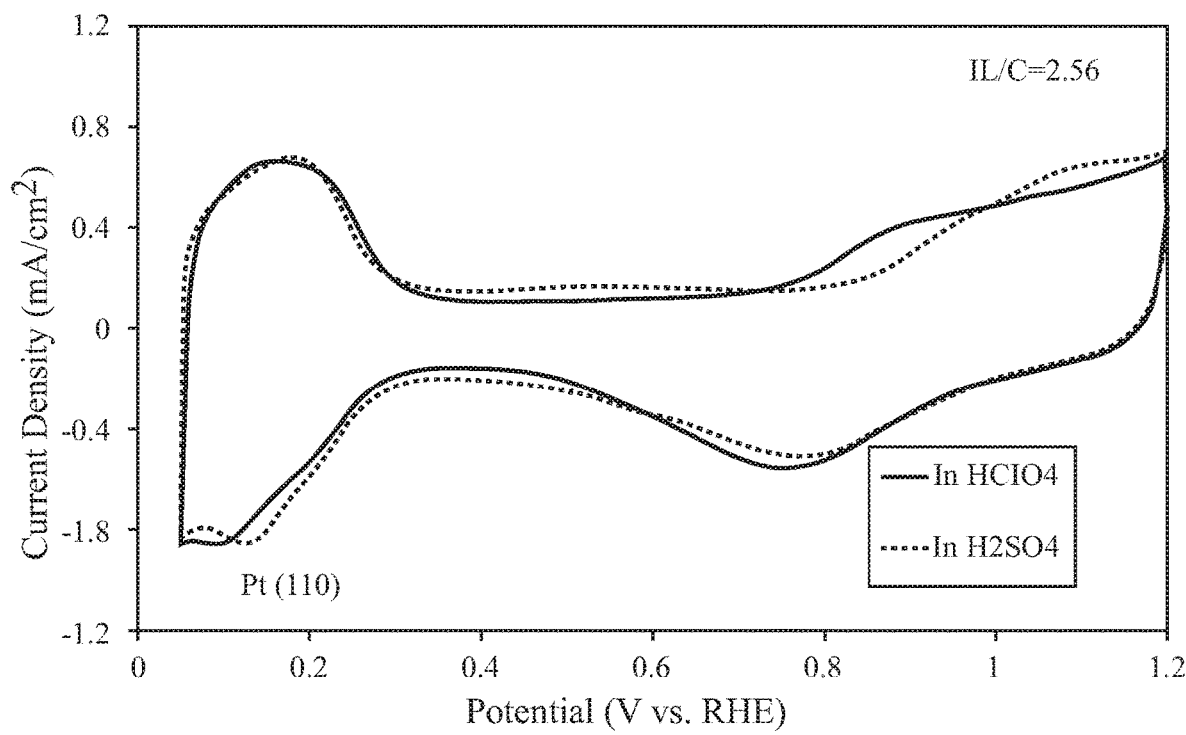
FIG. 9B is a series of cyclic voltammetry curves of Pt/C with ionic liquid to catalyst ratio (IL/C ratio) of 2.56 in $N_2$-saturated 0.1 M $HClO_4$ and $0.5H_2SO_4$.
Figure 9C:
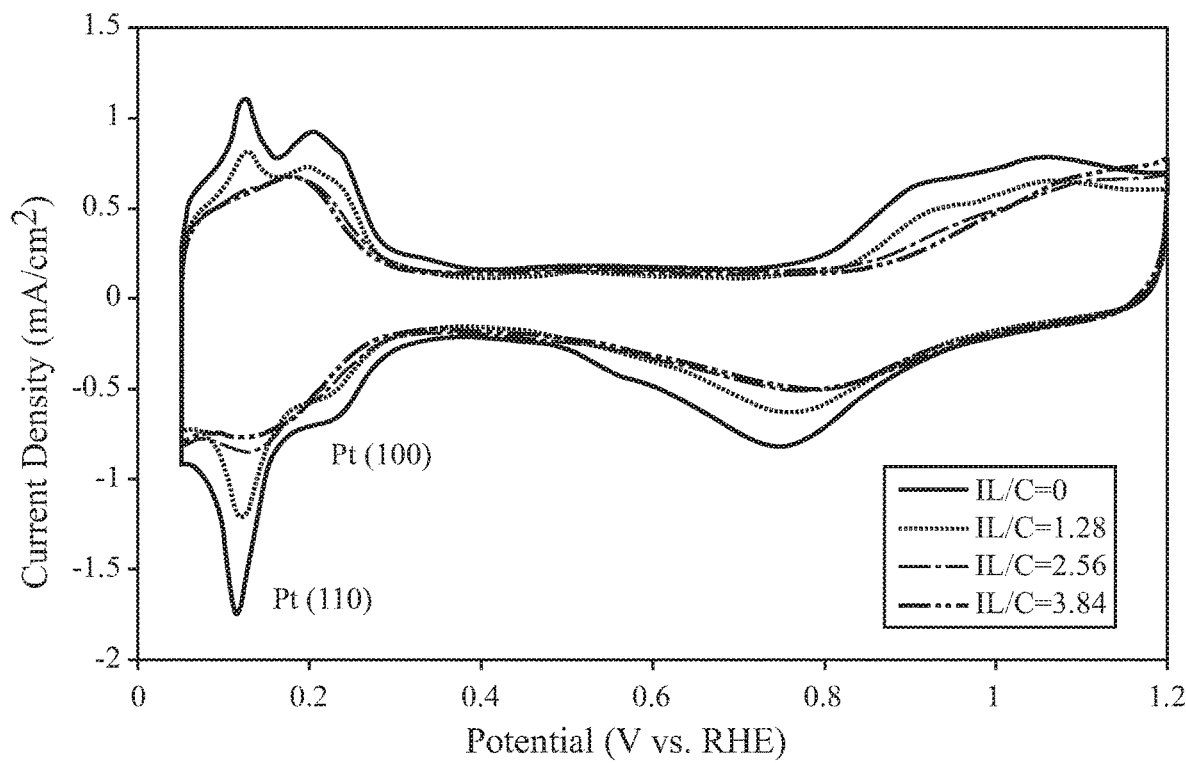
FIG. 9C is a series of cyclic voltammetry curves of Pt/C with various IL/C ratios in $N_2$-saturated $0.5H_2SO_4$.
Figure 9D:
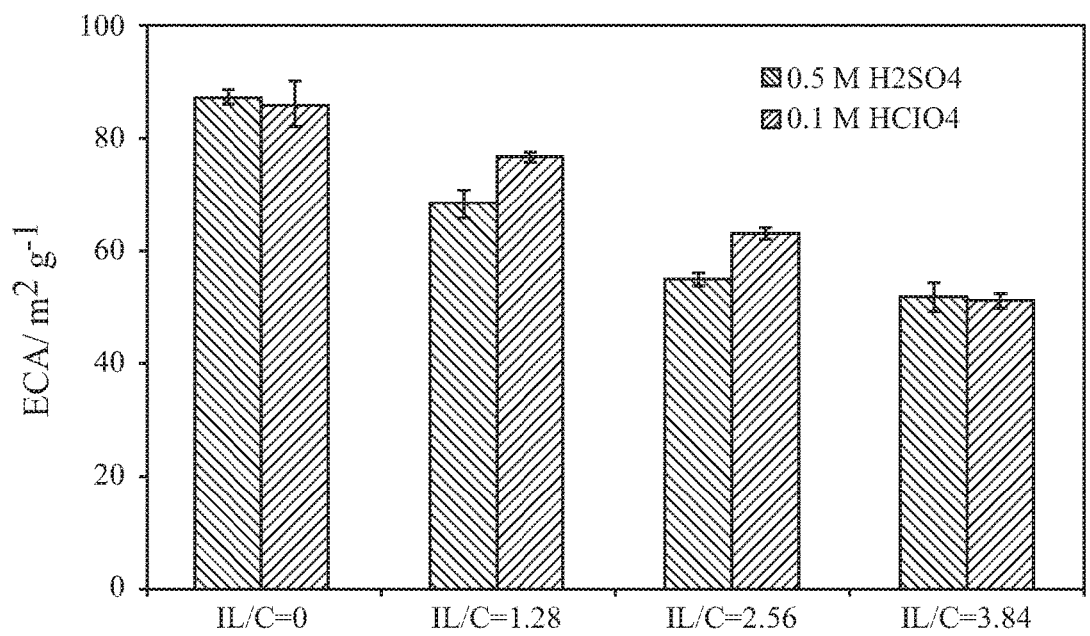
FIG. 9D shows electrochemically active surface are of Pt/C-IL systems measured in $N_2$-saturated 0.1 M $HClO_4$ and $0.5H_2SO_4$.

It will be understood that, in many systems, PEMFC performance will be largely dictated by secondary ionomer distribution, as the thickness of the ionomer influences transport of oxygen species and protons. To prove this, cyclic voltammetry experiments monitoring desorption/adsorption behavior of particular (bi)sulfate ions are performed to qualitatively determine the ionic liquid coverage on the platinum catalyst particles, as shown in FIGS. 9A-9D. When no ionic liquid contacted the catalyst particles (FIG. 9A), Pt/C in $H_2SO_4$ shows two sharper peaks in the Hupd, assigning to the signature hydrogen adsorption on Pt(100) and Pt(110), respectively. In contrast, the Pt(110) adsorption peak is less sharp and Pt(100) became broader when measuring in the $HClO_4$. This different hydrogen adsorption behavior can be reasonably assumed to be due to the strong adsorption/desorption of (bi)sulfate ions on the Pt. Meanwhile, the onset potential of Pt oxidation shifted positively in $H_2SO_4$ as compared to that that in $HClO_4$, indicating a competition mechanism between the adsorption of oxygenated species and (bi)sulfate ions. As shown in FIG. 9B, when the disclosed ionic liquid is present relative to catalyst at a ratio of 2.56, these effects are largely absent. This suggests that the ionic liquid might prevent the direct contact of Pt from the (bi)sulfate ions. FIG. 9C shows the cyclic voltammetry results in $H_2SO_4$ when the disclosed ionic liquid is present relative to catalyst at varying ratios. At IL/C ratio of 1.28, although the ECA suffered a loss, the pronounced hydrogen adsorption peaks on Pt(110) and Pt(100) can be still clearly seen, indicating that Pt is still accessible to the (bi)sulfate ions. Increasing IL/C to 2.56 and 3.84, the characteristic hydrogen adsorption peaks disappear and show a similar behavior as in the $HClO_4$. More importantly, the CV plots of IL/C=2.56 and 3.84 were almost overlapped under the entire potential range, showing a similar ECA value and amount of Pt-oxides formation. The ECA of Pt/C-[MTBD][$C_4F_9SO_3$] measured in 0.1 M $HClO_4$ and 0.5 M $H_2SO_4$ are shown in FIG. 9D. No significant changes were observed for the ECA of Pt/C in either electrolyte, suggesting that (bi)sulfate ions do not affect the available Pt sites in the Hupd region. However, between IL/C=1.28 and 2.56 the ECAs obtained in 0.1 M $HClO_4$ are larger than in 0.5 M $H_2SO_4$.

Figure 9E:
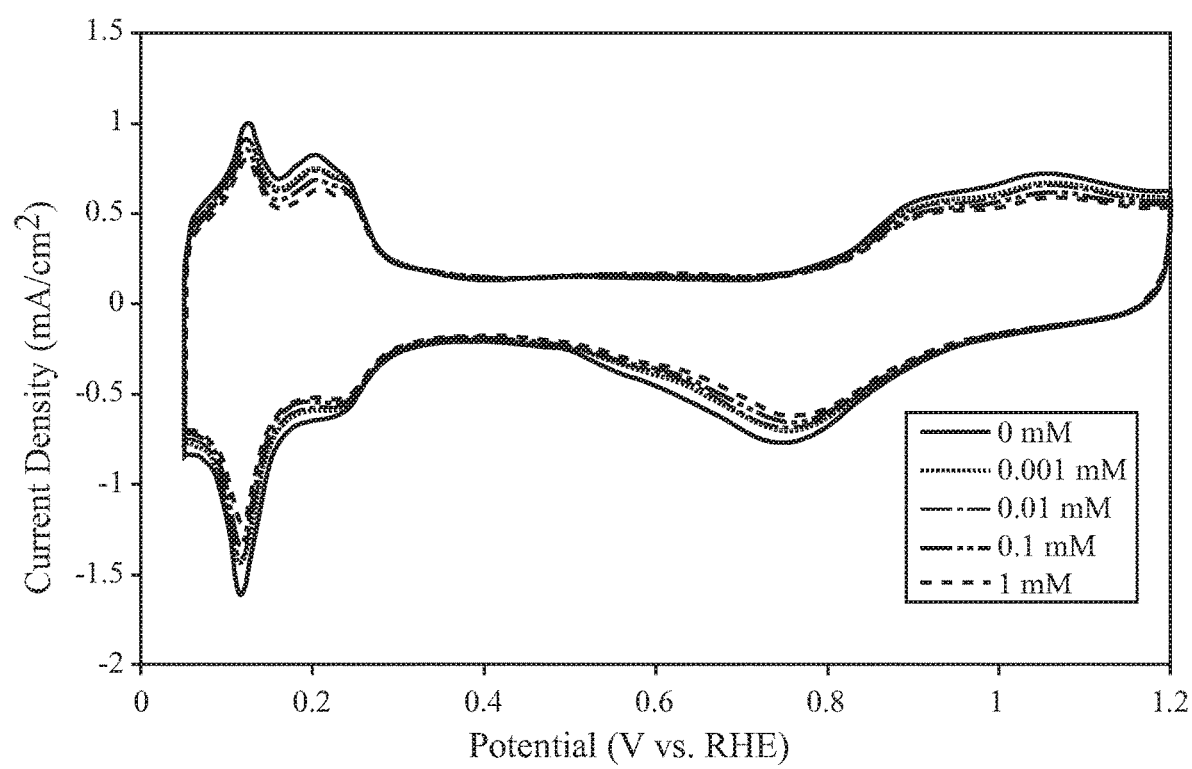
FIG. 9E is a series of cyclic voltammetry curves of Pt/C with K[$C_4F_9SO_4$] concentration from 0 mM to 1 mM in $N_2$-saturated 0.1 M $HClO_4$.

To explore the additional loss of ECA of Pt/C-[MTBD][$C_4F_9SO_3$] in $H_2SO_4$, an anion adsorption study similar to that discussed in relation to FIGS. 7A and 7B is shown in FIG. 9E. Under K[$C_4F_9SO_3$] concentration variation, the changes in cyclic voltammetry curves in 0.5 M $H_2SO_4$ are different from those observed in 0.1 M $HClO_4$. The ECA loss is also much larger (21% in $H_2SO_4$ vs. 8% in $HClO_4$ at 1 mM), and the decrease of Pt oxidation/Pt-oxides reduction region is more noticeable. All the findings suggest that the presence of both [$C_4F_9SO_3$]$^-$ and (bi)sulfate affect the processes of hydrogen adsorption on Pt and Pt-oxides formation.

On this basis, one can conclude that a ratio of [MTBD][$C_4F_9SO_3$] to catalyst in a range of 1.28:1 and 2.56:1 results in Pt that is partially covered by ionic liquid and is still accessible by the (bi)sulfate ions. Increasing the ratio of [MTBD][$C_4F_9SO_3$] to catalyst to 3.84:1 causes ECAs to be identical in both electrolytes, suggesting that Pt is completely prevented from contacting with (bi)sulfate ions and is thus completely covered. At low IL/C ratio, a partial coverage of ionic liquid is identified. Further increasing the IL/C ratio to 3.84 or beyond would yield full coverage on Pt surface.

Figure 10A:
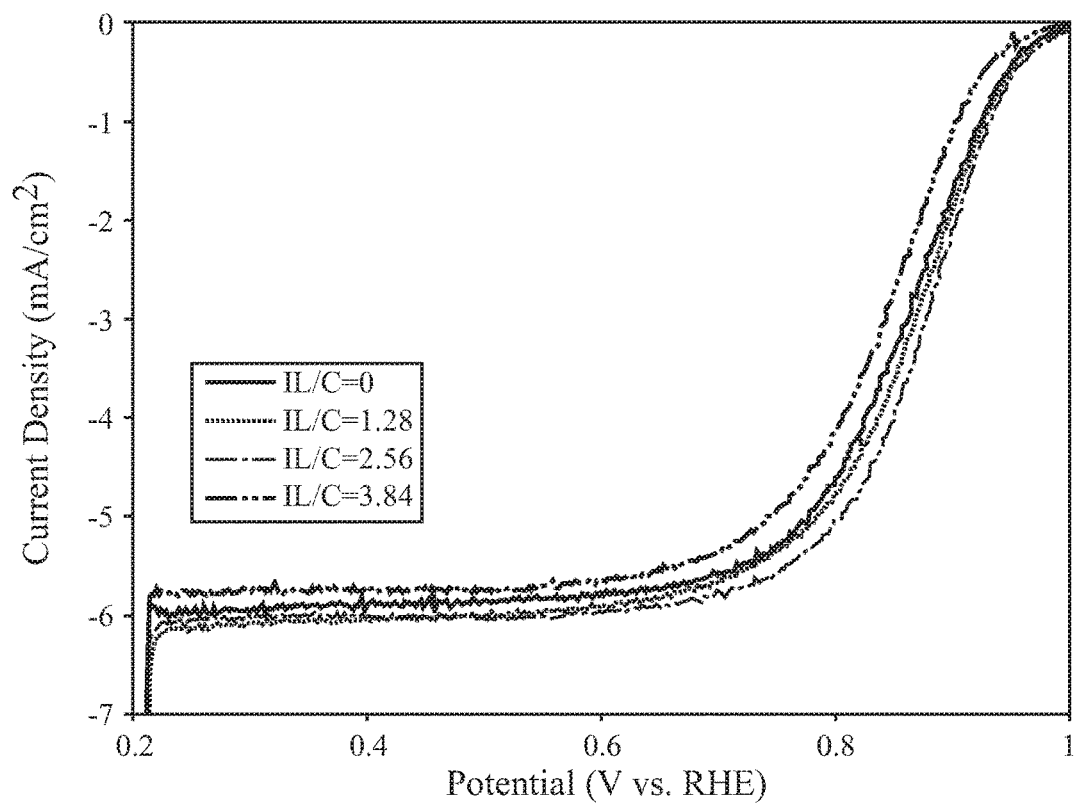
FIG. 10A is a series of oxygen reduction reaction (ORR) polarization curves of Pt/C with various IL/C ratios in $O_2$-saturated 0.1 M $HClO_4$ at rotation speed of 1600 rpm.
Figure 10B:
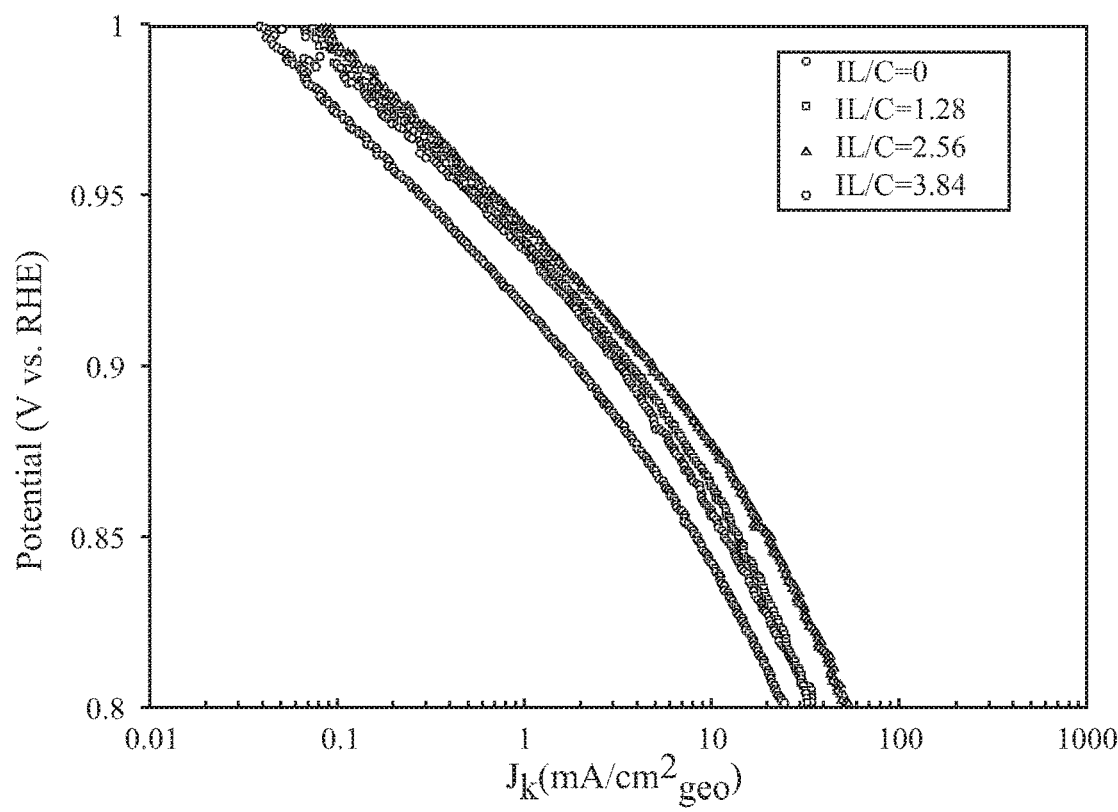
FIG. 10B is a series of ORR Tafel plots of Pt/C-IL systems.
Figure 10C:
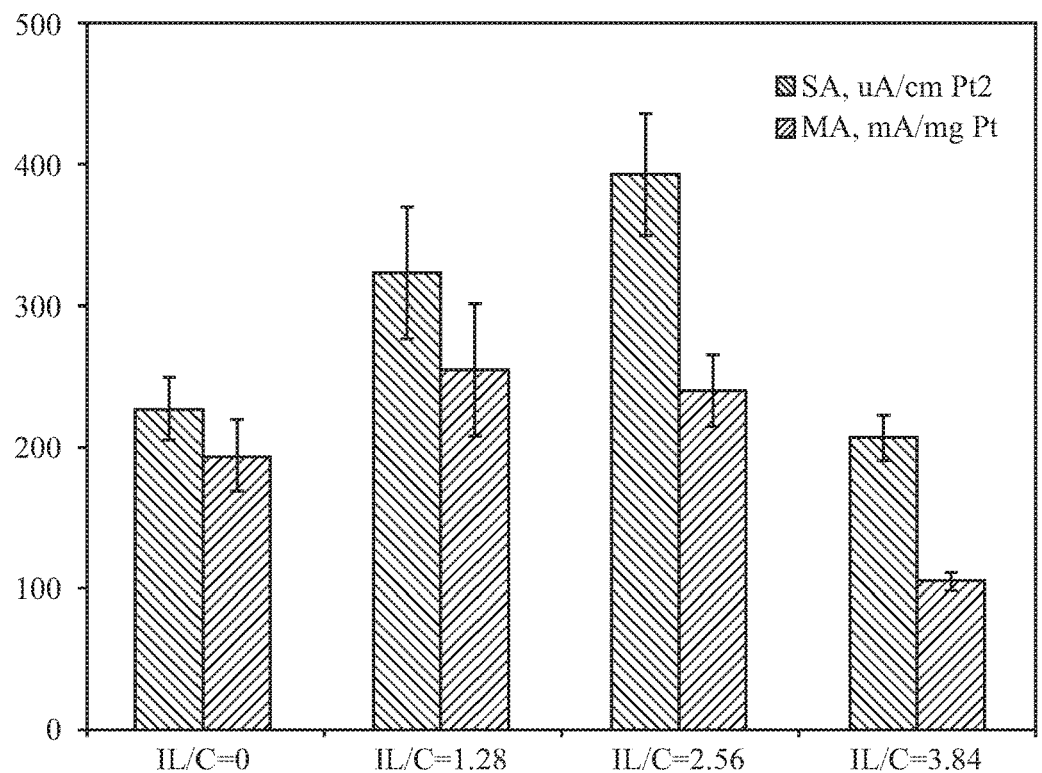
FIG. 10C is a plot of MA and SA for various ionomer-contacted catalysts calculated at 0.9 V.
Figure 10D:
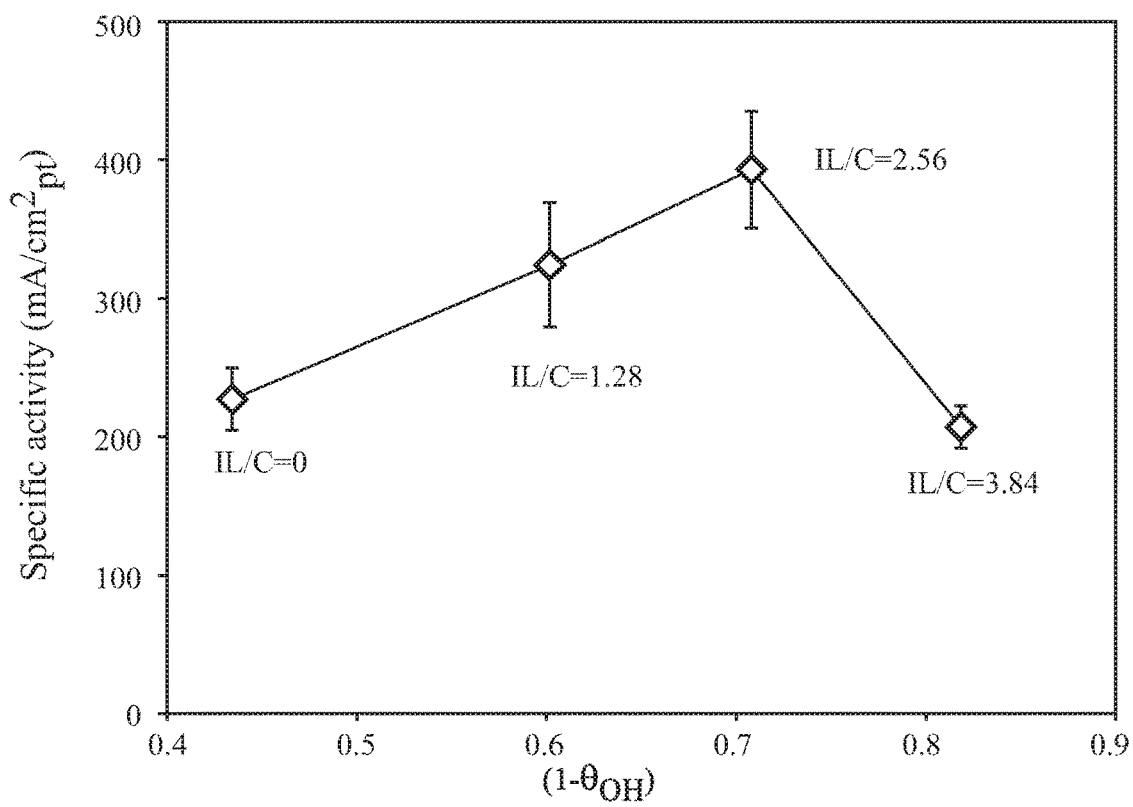
FIG. 10D is a plot of the correlation between the specific activity and free Pt sites $(1-\theta_{OH})$.
Figure 11A:
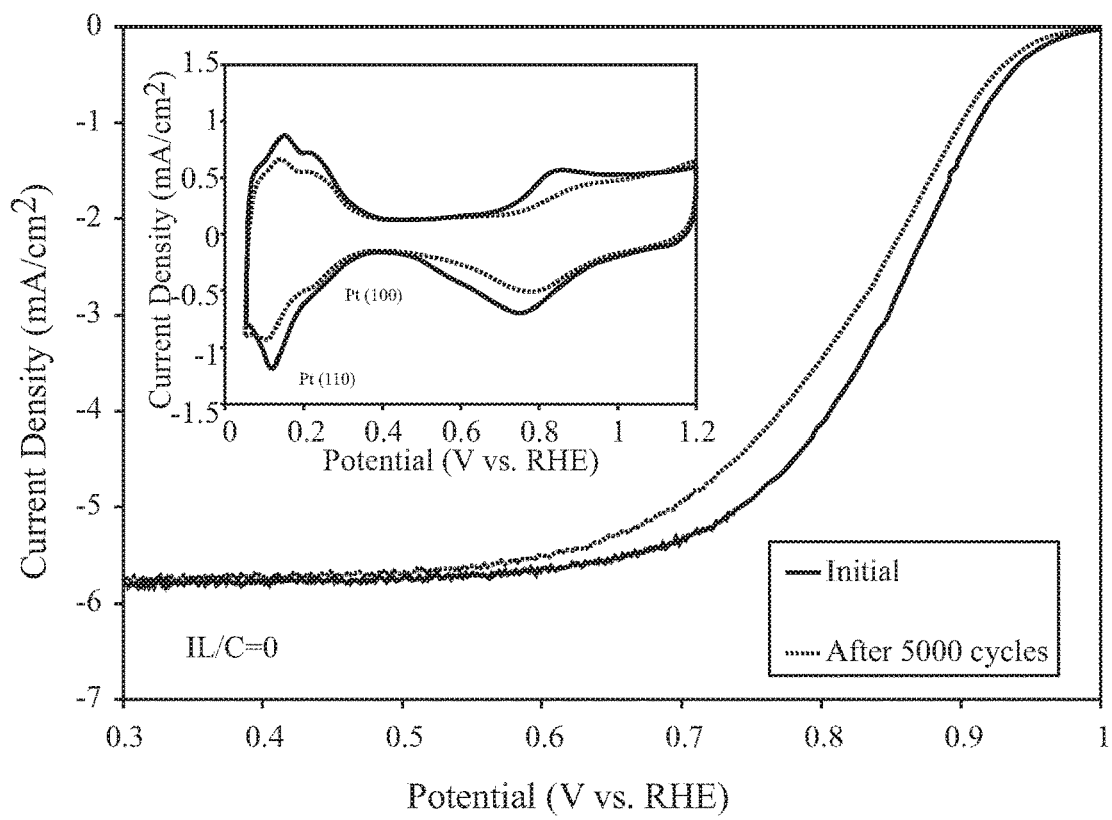
FIGS. 11A-11D are ORR polarization curves before and after 5000 potential cycles of Pt/C catalyst without ionomer, or with varying amount of ionomer.
Figure 11B:
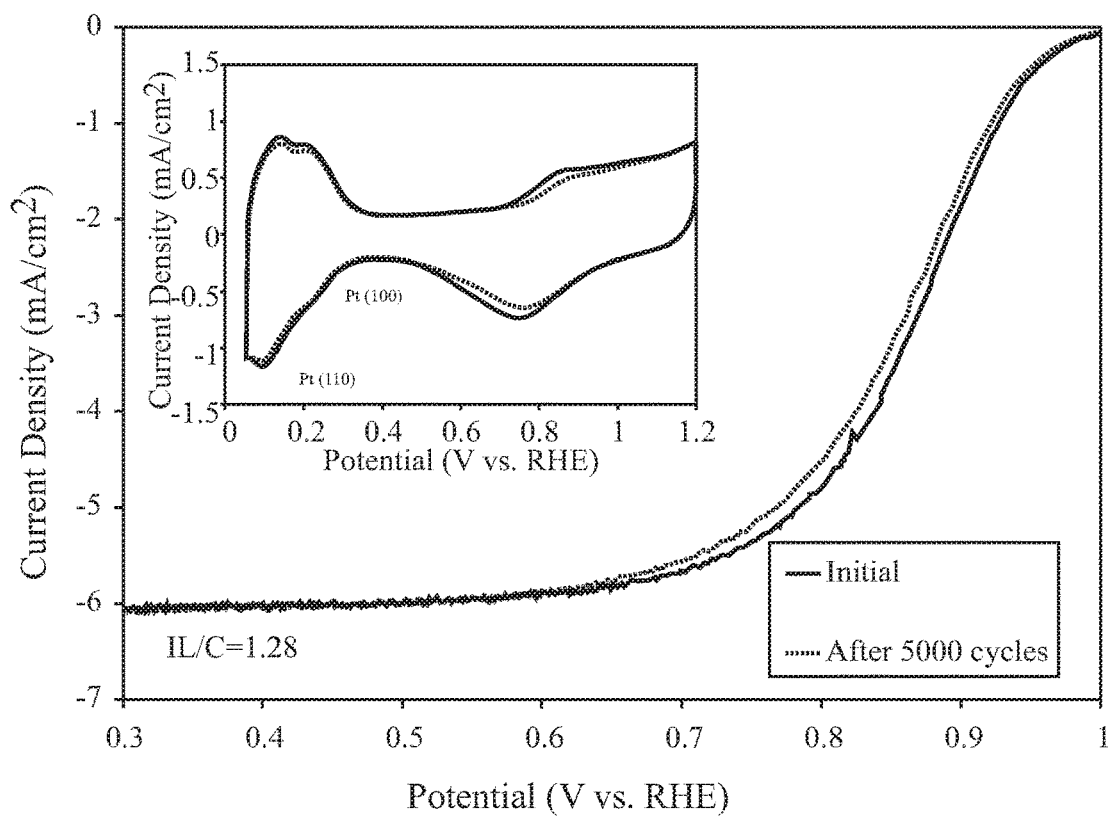
Figure 11C:
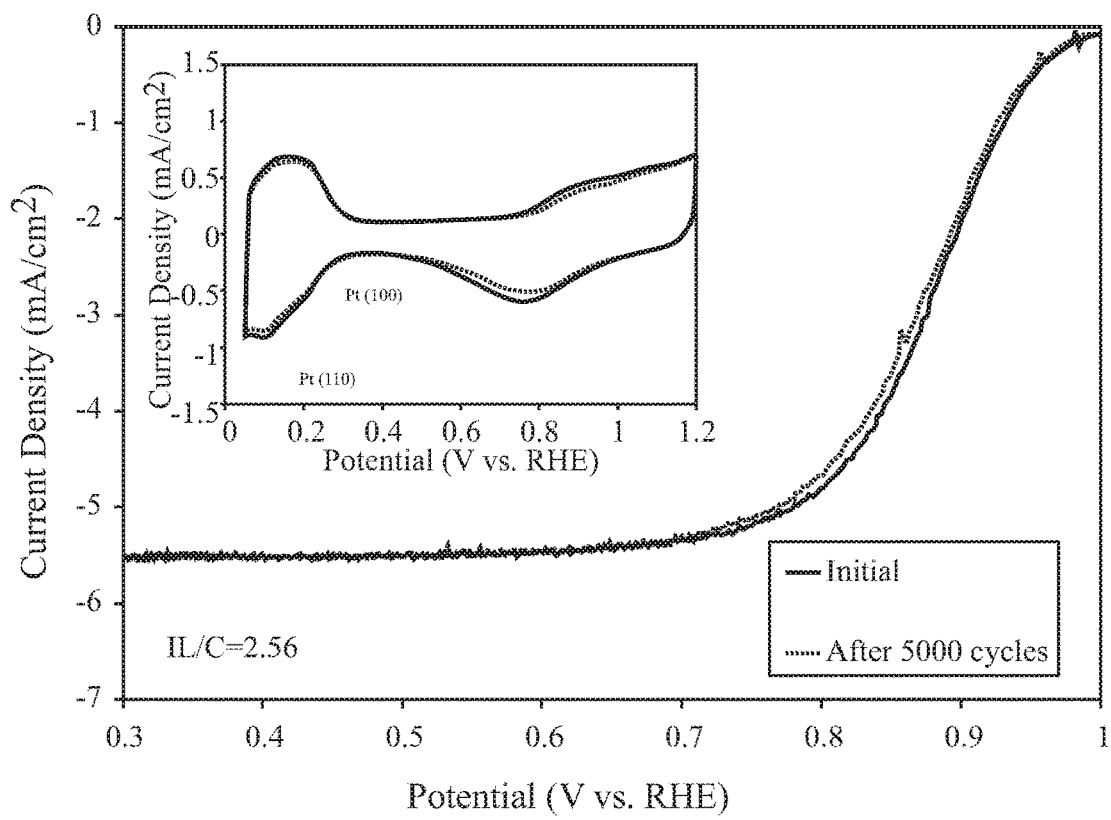
Figure 11D:
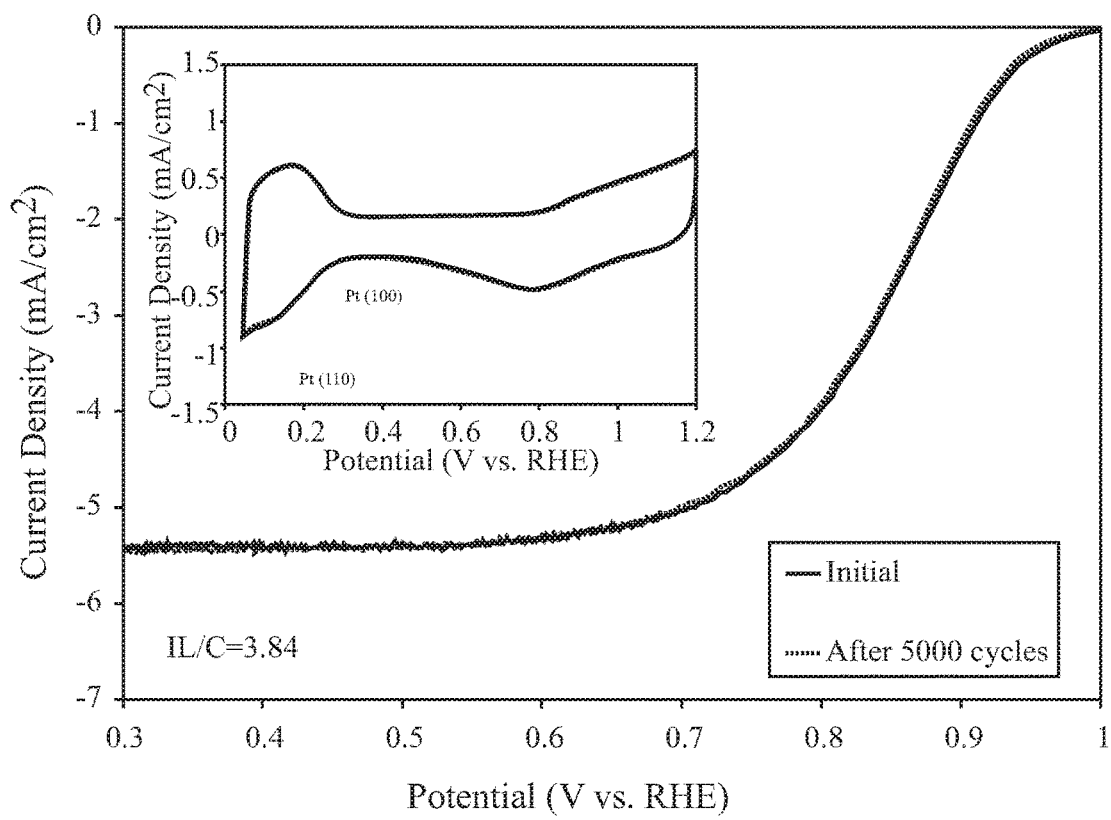

The anion adsorption and ionic liquid coverage further suggest that the ECA drop results substantially from the selective occupation of Pt facets (mainly Pt (110) and Pt (100)) by ionic liquid. The influence that the extent of catalyst particle coverage by the ionic liquid has on ORR activity is further addressed below. FIG. 10A shows polarization curves for catalysts having [MTBD][$C_4F_9SO_3$] contacting Pt/C at varying IL/C ratios. It can be seen that the half-wave potential of Pt/C-[MTBD][$C_4F_9SO_3$] shifts positively by ~11 mV for IL/C=1.28 and ~20 mV for IL/C=2.56 compared to the pristine Pt/C, indicating an enhanced ORR performance when the catalyst particles are contacted by the disclosed ionic liquid. However, excessive ionic liquid content causes a negative shift of half-wave potential. Correspondingly, a volcano dependence of ORR activity on IL/C is revealed, as shown in FIG. 10C. Specifically, MA and SA initially increased with increasing ionic liquid content followed by a decrease at higher ionic liquid amounts. As discussed above in reference to FIG. 4, the (1−θ) heavily influences the specific activity; therefore the SA is plotted against the (1−θ) as illustrated in FIG. 10D. A volcano-dependence of SA on (1−θ) is observed, with the greatest specific activity found when the ratio of [MTBD][$C_4F_9SO_3$] to catalyst exceeds about 1.25 and is less than about 3.85.

Between IL/C=0 and IL/C=2.56, the SA increases with decrease of $\theta_{OHad}$. The ionic liquid coverage study reveals that the Pt is partially covered by the IL, and a triple solid/liquid/gas (Pt/electrolyte/$O_2$) reaction phase is maintained. Even though the Pt/C-[MTBD][$C_4F_9SO_3$] suffers a loss of active surface area (FIG. 9D), the decoupling effect of nonreactive species by ionic liquid leads to an increase of SA. The mass activity is a product of ECA and SA, and the beneficial increase of SA is compromised by the decrease of ECA. Consequently, the gain of mass activity is limited by ~50 mA mg-1 Pt. Tafel plots (FIG. 10B) also indicated that in the kinetic region of 0.9 V or above, the differences of intrinsic activity (jk) between IL/C=0~2.56 are small. When the Pt surface is fully coated by ionic liquid (IL/C=3.56 or above), the $O_2$ diffusion effect overtakes the suppression effect of nonreactive species, and becomes the dominant factor. According to the Fick's law, the lower $O_2$ diffusion coefficient within ionic liquid and a longer diffusion pathway restricts the efficient $O_2$ flux, resulting in a dramatic decrease of ORR activity.

FIGS. 11A-11D show the polarization curves and cyclic voltammetry of Pt/C-[MTBD][$C_4F_9SO_3$] before and after 5000 potential cycling, at different ionic liquid to catalyst ratios. The ECA loss and activity loss at 0.9 V are summarized in Table 2. Pronounced CV and ORR behavior changes are observed for Pt/C, companied by 17.4% ECA loss, 30.3% specific activity loss, and 42.4% mass activity loss. In contrast, less noticeable degradations are found for Pt/C-[MTBD][$C_4F_9SO_3$] and the losses are alleviated, manifesting the protective effect of the disclosed ionic liquid. It will be understood that during an anodic scan, the Pt-oxides are formed through Reactions 1 and 2:

Pt+$H_2O$→PtO+2$H^+$+2$e^-$     Reaction 1

Pt+2$H_2O$→Pt$O_2$+4$H^+$+4$e^-$     Reaction 2

It will be understood that the presence of water is one of the key factors to generate the Pt-oxides and initiate the dissolution. Unlike a polymeric ionomer such as Nafion™ which has a hydrophilic domain, the ionic liquid of the present disclosure is highly hydrophobic with very low water solubility and can provide a lateral repulsion force to water. Thus a reduction in the amount of water adsorbed on Pt is expected. The ionic liquid coverage thus can determine the degree of Pt dissolution. For a partially covered Pt surface, a triple phase remains and water can still attach to Pt. However, for a fully covered Pt surface, water is substantially excluded from the surface of the catalytic metal. Therefore, we attribute the alleviation of Pt dissolution mainly to the surface coverage of IL. Thus cathode stability is maximized when the catalytic metal is fully covered by the disclosed ionic liquid.

TABLE 2

Summary of ECA, Specific activity and Mass activity loss after 5000 potential cycling.

|  | IL/C = 0 | IL/C = 1.28 | IL/C = 2.56 | IL/C = 3.84 |
| --- | --- | --- | --- | --- |
| ECA loss, % | 17.4 | 6.7 | 7.7 | 2.8 |
| Specific activity loss, % | 30.3 | 23.3 | 8.2 | 3.2 |
| Mass activity loss, % | 42.4 | 28.5 | 15.3 | 5.9 |

The present invention is further illustrated with respect to the following examples. It needs to be understood that these examples are provided to illustrate specific embodiments of the present invention and should not be construed as limiting the scope of the present invention.

Example 1. Synthesis of 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$])

A solution of MTBD (3.00 g, 0.0196 mol) in water (100 mL) is cooled down to 0° C., and Nitric Acid (1.76 g, 0.0196 mol) is added drop wise to the solution. This is followed by the addition of potassium nonafluorobutane sulfonate (8.58 g, 0.0196 mol), with stirring for 1 hour. The resulting ionic liquid is separated as a viscous fluid phase beneath the water phase. It is washed 4 times with ultrapure water The resulting ionic liquid is dried under reduced pressure at 50° C. for 18 hours to obtain a white material having a melting temperature of about 45° C.

Example 2. Synthesis of 1-methyl-2,3,4,6,7,8-hexahydro-1H-pyrimido[1,2-a]pyrimidin-9-ium bis((perfluoroethyl)sulfonyl)amide ([MTBD][Beti])

A solution of MTBD (2.51 g, 0.0164 mol) in water (100 mL) is cooled down to 0° C. and Nitric Acid (1.47 g, 0.0164 mol) is added drop wise to the solution. This is followed by the addition of Lithium Beti (6.34 g, 0.0164 mol) and stirred for 1 h. The ionic liquid is separated as a viscous fluid phase beneath the water phase. It is washed 4 times with ultrapure water The resulting ionic liquid is dried under reduced pressure at 50° C. for 18 h to obtain a colorless liquid.

Example 3. Synthesis of 1-methyl-2,3,4,6,7,8-hexahydro-1H-pyrimido[1,2-a]pyrimidin-9-ium bis((trifluoromethyl)sulfonyl)amide ([MTBD][TFSI])

A solution of MTBD (2.25 g, 0.0146 mol) in water (100 mL) is cooled down to 0° C. and Nitric Acid (1.32 g, 0.0146 mol) is added drop wise to the solution. This is followed by the addition of Lithium TFSI (4.22 g, 0.0146 mol) and stirred for 1 h. The ionic liquid is separated as a viscous fluid phase beneath the water phase. It is washed 4 times with ultrapure water The resulting ionic liquid is dried under reduced pressure at 50° C. for 18 h to obtain a colorless liquid.

Example 4. Synthesis of 1-methyl-2,3,4,6,7,8-hexahydro-1H-pyrimido[1,2-a]pyrimidin-9-ium 1,1,2,2,3,3,4,4,5,5,6,6,6-tridecafluorohexane-1-sulfonate ([MTBD][$C_6F_{13}SO_3$])

A solution of MTBD (2.51 g, 0.0164 mol) in water (100 mL) is cooled down to 0° C. and Nitric Acid (1.47 g, 0.0164 mol) is added drop wise to the solution. This is followed by the addition of Lithium Beti (6.34 g, 0.0164 mol) and stirred for 1 h. The ionic liquid is separated as a viscous fluid phase beneath the water phase. It is washed 4 times with ultrapure water The resulting ionic liquid is dried under reduced pressure at 50° C. for 18 h to obtain a white solid.

Example 5. Synthesis of 1-methyl-2,3,4,6,7,8-hexahydro-1H-pyrimido[1,2-a]pyrimidin-9-ium 1,1,2,2-tetrafluoro-2-(perfluoropropoxy)ethanesulfonate ([MTBD][$C_2F_5OC_2F_4SO_3$])

A solution of MTBD (2.00 g, 0.0131 mol) in water (100 mL) is cooled down to 0° C. and Nitric Acid (1.17 g, 0.0131 mol) is added drop wise to the solution. This is followed by the addition of Lithium Beti (4.62 g, 0.0131 mol) and stirred for 1 h. The ionic liquid is separated as a viscous fluid phase beneath the water phase. It is washed 4 times with ultrapure The resulting ionic liquid is dried under reduced pressure at 50° C. for 18 h to obtain a white solid.

Example 6. Preparation of Pt/C-Ionic Liquid Catalyst

A modified impregnation method route is adopted. Typically, ionic liquid stock solutions with concentration of 5 mg ionic liquid in 1 mL isopropanol are prepared. 9.5 mg Pt/C catalyst is placed in a vial and wet by 0.5 ml DI water first, followed by adding desired ionic liquid stock solution with various IL/C weight ratios of 0, 1.28, 2.56, and 3.84. The mixture is ultrasonicated for 20 min, and the solvent is slowly removed at 45° C. at ambient atmosphere. Finally, the obtained powder is further dried under high vacuum (~1 bar, room temperature) overnight.

Example 7. $O_2$ Solubility and Diffusion Coefficient Measurements

A gravimetric method is used to determine $O_2$ solubility in ILs. The weight change of the sample is monitored at a fix temperature and pressure as $O_2$ absorbed or desorbed. Specifically, a magnetic suspension balance (MSB) (Rubotherm GmbH) is used. Initially, about 1 g of ionic liquid sample is added to the sample bucket and then degassed to c.a. $10^{-5}$ bar. After evaporating the water and other volatile impurity, the chamber is pressurized with $O_2$ to a certain pressure. The vapor-liquid equilibrium between $O_2$ and the ionic liquid sample is reached and confirmed by constantly weighing for at least 20 mins. After obtaining the absorption isotherm, the pressure in the sample chamber is decreased stepwise to obtain the desorption isotherm. The absorption and desorption isotherms constituted a full isotherm. The values are corrected by buoyancy effect. The $O_2$ diffusion coefficient is obtained from a time-dependent absorption profile, and the $O_2$ absorption is mathematically modeled by a simplified mass diffusion process.

Example 8. Electrochemical Measurements

All electrochemical measurements are performed on an EC-LAB SP-300 (BioLogic) and the electrolytes are prepared with Millipore (Milli-Q Synthesis) water with a resistance greater than 18.2 MΩ·cm. A Pt wire (Pine) and a hydrogen reference electrode (Hydroflex,eDAQ) are used as counter electrodes and reference electrode, respectively. All potential in this work are reported against reversible hydrogen electrode (RHE) unless specified. 8 mL DI water, 4.5 mL Isopropanol and 50 ul 5% Nafion dispersion (D520, Ion Power) are added into the vial containing the prepared Pt/C-IL. The catalyst ink is subjected to 15 min ultrasonication in an ice bath. 10 ul aliquot is pipetted onto the glassy carbon (GC) disk (5 mm diameter, Pine) and rotational dried in air to form a uniform catalyst layer. For the control sample, Pt/C catalyst layer are prepared as exactly the same as Pt/C-IL, except the absence of IL. The calculated final Pt loading on the disk is 18 ug/$cm^2$ disk.

The catalyst coated GC is pre-conditioned in $N_2$-saturated 0.1 M $HClO_4$. Typically, the work disk is scanned from 0.05 V to 1.2 V with a scan rate of 100 mV s−1 until the cyclic voltammetry (CV) curve didn't change. After that, a stable CV is recorded from 0.05 to 1.2 V at 50 mV $s^{-1}$. ECA is obtained by integrating the charge under the hydrogen adsorption region (Hupd), assuming 210 uC $cmPt^{-2}$. Electrochemical impedance spectroscopy (EIS) is performed at 0.45 V in N2-saturated $HClO_4$ to measure the ohmic resistance and protonic resistance. The coverage of $OH_{ad}$ on Pt surface ($\theta_{OHad}$) at 0.9 V is calculated using an equation suggested by Zhang et al. The ORR measurements are carried in $O_2$-saturated 0.1 M $HClO_4$. Multiple rotation rates are chosen and the Koutecky-Levich equation is used to determine the kinetic current (ik). All the calculations are IR compensated and $N_2$-background corrected, to fully reveal the ik. At least 4 independent data sets are collected to ensure the reproducibility. Finally, the Pt/C-ILs are cycled for 5000 times in $N_2$-saturated 0.1 M $HClO_4$ at potential range of 0.6 V to 1.0 V at a scan rate of 50 mV s−, a protocol suggested by U.S. Department of Energy to assess the Pt dissolution performance. The initial and after cycling performance are evaluated by repeating the CV and ORR procedures described above.

The Pt/C-ILs are also studied in 0.5 M $H_2SO_4$ to investigate the ionic liquid coverage on the Pt surface. The characteristic hydrogen adsorption peak on Pt(110) and Pt(100) in the presence of (bi)sulfate ions is used as a direct indictor to qualitatively determine the ionic liquid coverage. To study the anion adsorption effect of [MTBD][$C_4F_9SO_3$], $KC_4F_9SO_3$ salt is used to simulate the free anion [$C_4F_9SO_3$]−. 0 mM, 0.001 mM, 0.01 mM, 0.1 mM and 1 mM $KC_4F_9SO_3$ in 0.1 M $HClO_4$ and 0.5 M $H_2SO_4$ are prepared, respectively. CV and ORR are examined at each $KC_4F_9SO_3$ concentration.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An oxygen reduction reaction (ORR) catalyst comprising: a metal catalyst; and
   a secondary ionomer contacting the solid catalyst, the secondary ionomer consisting of 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]), wherein the [MTBD][$C_4F_9SO_3$] is present at a weight ratio relative to the metal catalyst within a range of 1.25:1 to 3.85:1.

2. The ORR catalyst as recited in claim 1, wherein the metal catalyst comprises platinum nanoparticles.

3. The ORR catalyst as recited in claim 1, wherein the metal catalyst comprises particles of platinum on carbon or particles of platinum mixed with carbon particles.

4. The ORR catalyst as recited in claim 1, wherein the [MTBD][$C_4F_9SO_3$] is present at a weight ratio relative to the metal catalyst within a range of 2:1 to 3:1.

5. The ORR catalyst as recited in claim 1, wherein the [MTBD][$C_4F_9SO_3$] is present at a weight ratio relative to the solid metal catalyst within a range of 2.5:1 to 2.6:1.

6. The ORR catalyst as recited in claim 1, comprising a polymeric ionomer in physical contact with the metal catalyst.

7. The ORR catalyst as recited in claim 1, wherein the secondary ionomer completely coats the metal catalyst.

8. The ORR catalyst as recited in claim 1, wherein the secondary ionomer partially coats the metal catalyst.

9. The ORR catalyst as recited in claim 1, wherein the secondary ionomer comprises porous particles and the secondary ionomer is at least partially impregnated in the porous particles.

10. A cathode or oxygen reduction; the cathode comprising: a cathodic current collector;
    a metal catalyst; and
    a secondary ionomer contacting the solid catalyst, the secondary ionomer consisting of 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]), wherein the [MTBD][$C_4F_9SO_3$] is present at a weight ratio relative to the metal catalyst within a range of 1.25:1 to 3.85:1.

11. The cathode as recited in claim 10, wherein the metal catalyst comprises platinum nanoparticles.

12. The cathode as recited in claim 10, wherein the metal catalyst comprises particles of platinum on carbon or mixed with carbon particles.

13. The cathode as recited in claim 10, wherein the [MTBD][$C_4F_9SO_3$] is present at a weight ratio relative to the metal catalyst within a range of 2:1 to 3:1.

14. The cathode as recited in claim 10, wherein the [MTBD][$C_4F_9SO_3$] is present at a weight ratio relative to the metal catalyst within a range of 2.5:1 to 2.6:1.

15. The ORR catalyst as recited in claim 1, comprising a polymeric ionomer in physical contact with the metal catalyst.

16. A polymer electrolyte fuel cell comprising the cathode of claim 10.

* * * * *

UNITED STATES PATENT AND TRADEMARK OFFICE
CERTIFICATE OF CORRECTION

Page 1 of 1

PATENT NO. : 10,777,823 B2
APPLICATION NO. : 15/477967
DATED : September 15, 2020
INVENTOR(S) : Kan Huang et al.

It is certified that error appears in the above-identified patent and that said Letters Patent is hereby corrected as shown below:

In the Claims

Column 13, Line 53, Claim 1 "contacting the solid catalyst" should be -- contacting the metal catalyst --

Column 14, Line 31, Claim 10 "contacting the solid catalyst" should be -- contacting the metal catalyst --

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*